United States Patent
Iinuma

(10) Patent No.: US 10,073,329 B2
(45) Date of Patent: Sep. 11, 2018

(54) OPTICAL COMPENSATION ELEMENT ADJUSTING MECHANISM AND PROJECTOR

(71) Applicant: SEIKO EPSON CORPORATION, Tokyo (JP)

(72) Inventor: Kazuyuki Iinuma, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/518,343

(22) PCT Filed: Oct. 23, 2015

(86) PCT No.: PCT/JP2015/005345
§ 371 (c)(1),
(2) Date: Apr. 11, 2017

(87) PCT Pub. No.: WO2016/067580
PCT Pub. Date: May 6, 2016

(65) Prior Publication Data
US 2017/0307967 A1    Oct. 26, 2017

(30) Foreign Application Priority Data

Oct. 27, 2014 (JP) ................... 2014-218488
Aug. 10, 2015 (JP) ................... 2015-158558

(51) Int. Cl.
*G03B 21/14* (2006.01)
*G02B 27/00* (2006.01)
(Continued)

(52) U.S. Cl.
CPC ....... *G03B 21/147* (2013.01); *G02B 27/0068* (2013.01); *G02F 1/133308* (2013.01);
(Continued)

(58) Field of Classification Search
CPC ...... G03B 21/14; G03B 21/28; G03B 21/145; H04N 9/31; H04N 9/3105; H04N 9/3141;
(Continued)

(56) References Cited

U.S. PATENT DOCUMENTS 5,868,485 A * 2/1999 Fujimori ............... G02B 7/00
348/E5.141
RE40,296 E    5/2008 Fujimori et al.
(Continued)

FOREIGN PATENT DOCUMENTS

JP    2000-2932 A    1/2000
JP    2009-42262 A    2/2009
(Continued)

OTHER PUBLICATIONS

Jan. 26, 2016 International Search Report issued in International Patent Application No. PCT/JP2015/005345.
(Continued)

*Primary Examiner* — Sultan Chowdhury
(74) *Attorney, Agent, or Firm* — Oliff PLC

(57) ABSTRACT

An optical compensation element adjusting mechanism capable of adjusting an inclination of an optical compensation element with high accuracy and a projector. The mechanism includes an optical compensation element which optically compensates a liquid crystal panel and an adjusting frame which adjusts an angle of the element to the liquid crystal panel. The adjusting frame includes an approximately rectangular holding portion which holds the optical compensation element, a pair of fixing portions which respectively extends from positions, which become a diagonal, of the holding portion in a direction intersecting with the holding portion and which is respectively fixed to a first holding member to which the adjusting frame is attached, and an adjusting portion which is disposed at a position
(Continued)

away from the pair of fixing portions and which inclines the optical compensation element by inclining the holding portion around a virtual line connecting the pair of fixing portions.

16 Claims, 21 Drawing Sheets

(51) Int. Cl.
    *G02F 1/1333* (2006.01)
    *G02F 1/1335* (2006.01)
    *G03B 21/16* (2006.01)
    *G03B 21/00* (2006.01)
    *G03B 33/12* (2006.01)

(52) U.S. Cl.
    CPC ..... *G02F 1/133528* (2013.01); *G03B 21/006* (2013.01); *G03B 21/145* (2013.01); *G03B 21/16* (2013.01); *G03B 33/12* (2013.01)

(58) Field of Classification Search
    CPC ........ G02F 2001/133314; G02F 2001/133317; G02F 2001/13332; G02F 2001/133322; G02F 1/133308
    See application file for complete search history.

(56) References Cited

U.S. PATENT DOCUMENTS

| | | | |
|---|---|---|---|
| 2002/0021416 A1* | 2/2002 | Ogawa | G03B 21/28 353/51 |
| 2005/0157276 A1 | 7/2005 | Kitabayashi et al. | |
| 2007/0247597 A1* | 10/2007 | Lin | G03B 21/28 353/98 |
| 2009/0040464 A1 | 2/2009 | Utagawa | |
| 2010/0245742 A1 | 9/2010 | Fuse | |

FOREIGN PATENT DOCUMENTS

| | | |
|---|---|---|
| JP | 2010020052 A | 1/2010 |
| JP | 2010054657 A | 3/2010 |
| JP | 2010-286691 A | 12/2010 |
| JP | 2013-015724 A | 1/2013 |
| TW | 200527026 A | 8/2005 |
| WO | 2005038521 A1 | 4/2005 |

OTHER PUBLICATIONS

Feb. 20, 2018 Extended Search Report issued in European Patent Application No. 15855710.8.

* cited by examiner

OPTICAL COMPENSATION ELEMENT ADJUSTING MECHANISM AND PROJECTOR

CROSS REFERENCE TO RELATED APPLICATION

The entire disclosure of Japanese Patent Application No. 2014-218488, filed Oct. 27, 2014 and No. 2015-158558, filed Aug. 10, 2015 is expressly incorporated by reference herein.

TECHNICAL FIELD

The present invention relates to an optical compensation element adjusting mechanism and a projector.

BACKGROUND ART

Conventionally, a projector including a light source device, a light modulation device which modulates light emitted from the light source device, and a projection optical device which projects modulated light is known. As the projector, a projector which intends to enhance contrast of a projection image and includes an optical compensation element provided at a light emission side of a liquid crystal panel as a light modulation device is suggested (for example, see PTL 1).

In the projector described in PTL 1, a compensation element adjusting mechanism which adjusts an inclination posture of an optical compensation element with respect to a liquid crystal panel is included.

Specifically, the compensation element adjusting mechanism includes a frame supporting the optical compensation element and a holder member to which the frame is attached, a fixing member, and a sheet metal for fixation.

Among those components, a lever member used for an angle adjustment is provided in the frame.

The holder member has a first joining portion which is positioned on one side thereof and to which a liquid crystal panel is joined and a second joining portion which is positioned on the other side thereof and to which a polarizing filter is attached, and a space for accommodating the frame is formed between the joining portions. Slit-shaped supporting grooves are formed on respective side wall portions connecting respective joining portions, a shaft member formed at the lower left of the front surface of the frame is fitted in one supporting groove with predetermined loosening, and a shaft member formed at the lower right of the front surface of the frame is fitted in the other supporting groove with predetermined loosening. In this case, hook portions formed at end portions of respective shaft members cooperate to regulate a movement of the frame relating to the lateral direction parallel to a main surface of an optical compensation element and thus, the frame becomes smoothly rotatable within the holder member. A sheet metal for fixation is attached to the light emission side in the holder member.

The fixing member is attached to the upper portion in the first joining portion of the holder member. The fixing member has a pair of protruding portions functioning as a rail and the lever member is clamped by the protruding portions to thereby making it possible to finely adjust the posture of the frame or the optical compensation element in addition to making the posture of frame stable.

By operating the lever member, the frame is rotated and the inclination posture of the optical compensation element is adjusted, and then the frame and the holder member are fixed by adhesive.

CITATION LIST

Patent Literature

PTL 1: JP-A-2009-42262

SUMMARY OF INVENTION

Technical Problem

However, the compensation element adjusting mechanism described in PTL 1 has a complicated configuration composed of a combination of a plurality of members and thus, the manufacturing cost of the compensation element adjusting mechanism becomes relatively high. For that reason, a configuration capable of reducing the manufacturing cost with a simple configuration is needed.

One of the objects of the invention is to provide an optical compensation element adjusting mechanism capable of adjusting a position of an optical compensation element with a simple configuration and a projector.

Solution to Problem

An optical compensation element adjusting mechanism according to a first aspect of the invention includes an optical compensation element which optically compensates a light modulation device and an adjusting frame which adjusts an angle of the optical compensation element to the light modulation device, and the adjusting frame includes an approximately rectangular holding portion which holds the optical compensation element, a pair of fixing portions which respectively extends from positions, which become an approximately diagonal, of the holding portion in a direction intersecting with the holding portion and which is respectively fixed to an attaching member to which the adjusting frame is attached, an adjusting portion which is disposed at a position away from the pair of fixing portions and which inclines the optical compensation element by inclining the holding portion around a virtual line connecting the pair of fixing portions.

According to the first aspect, in the adjusting frame, the holding portion which holds the optical compensation element is fixed to the attaching member by two fixing portions. The holding portion is inclined by the adjusting portion such that the holding portion is rotated by using the virtual line as the rotational axis and an inclination amount of the optical compensation element with respect to the attaching member is adjusted. According to this, the inclination amount of the holding portion which holds the optical compensation element is adjusted with respect to the attaching member disposed at a suitable position to the light modulation device to thereby make it possible to suitably adjust the inclination amount of the optical compensation element with respect to the light modulation device. In the configuration, the adjusting frame can be configured as an integral one piece and thus, it is possible to configure an optical compensation element adjusting mechanism with a simpler configuration compared to a case where the adjusting frame is configured by combining a plurality of members. Accordingly, it is possible to adjust the position of the optical compensation element by the adjusting frame with a simple configuration.

In the first aspect, it is preferable that the adjusting portion is moved in the direction of approaching the attaching member to thereby incline the holding portion.

According to the first aspect, the adjusting portion is moved in the direction of approaching the attaching member to thereby simply adjust the holding portion, eventually, the inclination amount of the optical compensation element. Accordingly, it is possible to simply adjust a position of the optical compensation element.

In the first aspect, it is preferable that the adjusting portion includes a hole portion into which an insertion member inserted into the attaching member is inserted, and a moving amount to the attaching member is adjusted according to the insertion amount of the insertion member to the attaching member to thereby adjust the inclination amount of the holding portion.

As the insertion member, a screw screwed to the attaching member can be exemplified.

According to the first aspect, when the insertion amount of the insertion member increases, the adjusting portion moves in a direction of approaching the attaching member and thus, the insertion amount is adjusted to thereby make it possible to finely adjust the position of the optical compensation element in addition to making it possible to easily adjust the inclination amount of the optical compensation element. Accordingly, it is possible to finely adjust the position of the optical compensation element even after the adjusting frame is fixed to the attaching member, in addition to making it possible to easily adjust the position of the optical compensation element with a simple configuration.

In the first aspect, it is preferable that the holding portion is inclined by the adjusting portion to thereby urge the insertion member to a direction opposite to an insertion direction.

According to the first aspect, when the holding portion is inclined according to insertion of the insertion member, the holding portion urges the insertion member to the direction opposite to the insertion direction. With this, it is possible to set an inclination amount of the holding portion to a value according to the insertion amount of the insertion member and maintain an inclined state of the holding portion.

In the first aspect, it is preferable that the adjusting portion is provided in the vicinity of a corner portion different from arrangement positions of the pair of fixing portions in the holding portion.

In the first aspect, fixing portions are provided at two corner portions, which are in a diagonal relationship, of the approximately rectangular holding portion and the adjusting portion is provided in the vicinity of another corner portion. According to this, the position of the adjusting portion is away from the virtual line. With this, for example, force to rotate the holding portion by using the virtual line as a rotational axis is able to enlarge torque when acting on the adjusting portion and thus, it is possible to easily rotate the holding portion. Accordingly, it is possible to more easily perform the position adjustment of the optical compensation element.

In the first aspect, it is preferable that the adjusting portion is formed so as to be extended from the adjusting frame to the outer peripheral side, the adjusting portion includes a first abutting portion abutting onto the attaching member and a second abutting portion onto which a moving member moving approximately parallel to a surface opposing the optical compensation element in the attaching member is abutted, and the first abutting portion has flexibility.

As the moving member, a screw screwed to the attaching member or the like can be exemplified.

According to the first aspect, the second abutting portion moves according to the movement of the moving member and the first abutting portion is flexed according to the movement of the second abutting portion and thus, for example, when the second abutting portion is moved by the moving member to the maximum, the holding portion is inclined to the maximum. According to this, it is possible to adjust the position of the optical compensation element by the adjusting frame with a simple configuration. The moving member moves approximately parallel to a surface opposing the optical compensation element of the attaching member and thus, for example, it is possible to move the moving member even when the moving member is covered by another member (for example, emission side polarizing plate). Accordingly, it is possible to adjust positions of the holding portion and the optical compensation element held in the holding portion even after the optical compensation element adjusting mechanism is assembled.

In the first aspect, it is preferable that the inclination amount of the holding portion is adjusted according to a moving amount of the moving member in a state of being abutted onto the second abutting portion.

According to the first aspect, the moving amount is adjusted to thereby make it possible to finely adjust the position of the optical compensation element, in addition to making it possible to easily adjust the inclination amount of the optical compensation element. Accordingly, it is possible to finely adjust the position of the optical compensation element even after the adjusting frame is fixed to the attaching member, in addition to making it possible to easily adjust the position of the optical compensation element with a simple configuration.

In the first aspect, it is preferable that the adjusting frame has a pair of the adjusting portions and the pair of adjusting portions is formed at a position which becomes approximately point symmetric with respect to the center of the optical compensation element when viewed from the attaching member side.

Here, in a case where the optical compensation element adjusting mechanism is used in the projector, a liquid crystal panel for green light is needed to invert light incident onto the liquid crystal panel unlike the other liquid crystal panels among a liquid crystal panel for red light, a liquid crystal panel for green light, and a liquid crystal panel for blue light and thus, the rotational axis which inclines the optical compensation element of the optical compensation element adjusting mechanism corresponding to the liquid crystal panel for green light needs to be different. For that reason, in the optical compensation adjusting mechanism of related art, it is necessary to individually provide optical compensation element adjusting mechanisms for the liquid crystal panels corresponding to red light and blue light and an optical compensation element adjusting mechanism for the liquid crystal panel corresponding to green light.

In contrast, according to the first aspect, the pair of adjusting portions is formed approximately point symmetric with respect to the center of the optical compensation element and thus, it is possible to make the rotational axis of the optical compensation element differ by rotating the adjusting frame 180°. Accordingly, it is possible to use the same adjusting frame in the optical compensation element adjusting mechanism corresponding to each of all liquid crystal panels and thus, the manufacturing cost can be reduced.

In the first aspect, it is preferable that the second abutting portion urges the moving member by reaction force which is received by the first abutting portion from the attaching member.

According to the first aspect, the second abutting portion urges the second abutting portion to a direction opposite to the movement direction due to reaction force which is received by the first abutting portion from the attaching member when the second abutting portion is moved according to the movement of the moving member. With this, it is possible to set the inclination amount of the holding portion to a value according to the moving amount of the moving member and to maintain the inclined state of the holding portion.

In the first aspect, it is preferable that the virtual line is a straight line inclined approximately at 45° with respect to respective sides of the optical compensation element held in the holding portion.

Here, in a case where the light modulation device is a liquid crystal panel of a vertical alignment (VA), an optical axis (slow axis) of the optical compensation element is inclined approximately at 45° with respect to respective sides (end edges) of the approximately rectangular optical compensation element.

In contrast, according to the first aspect, the virtual line connecting the fixing portions is a straight line inclined approximately at 45° with respect to respective sides of the optical compensation element to thereby make it possible to rotate the optical compensation element by using the slow axis of the optical compensation element as the rotational axis. Accordingly, it is possible to suitably and certainly adjust the position of the optical compensation element with respect to the light modulation device.

Inclining of the virtual line approximately at 45° with respect to respective sides of the optical compensation element means that the inclination angle of the virtual line is included in an angle range in which the optical compensation element can be positioned by being centered on 45° with desired accuracy.

In the first aspect, it is preferable that the attaching member includes a plurality of engagement portions with which the pair of fixing portions is engaged and the pair of fixing portions and the plurality of engagement portions respectively have notches engaging with each other.

According to the first aspect, any one of a plurality of engagement portions of the attaching member is engaged with the engagement portion of the pair of fixing portions such that the holding portion is inclined by using the engagement site as a fulcrum. With this, it is possible to rotate the optical compensation element around the rotational axis which uses at least two fulcrums as the center. Accordingly, it is possible to adjust suitably and certainly the position of the optical compensation element with respect to the light modulation device.

In the first aspect, it is preferable that at least any one of the pair of fixing portions has a bent portion bent from the holding portion and a fixing body portion extending from a tip of the bent portion approximately parallel to the holding portion and fixed to the attaching member.

According to the first aspect, at least any one of the pair of fixing portions has the bent portion bent from the holding portion and the fixing body portion extending from a tip side of the bent portion, and the fixing portion is fixed to the attaching member by the fixing body portion. According to this, the bent portion is flexed to thereby make it possible to easily incline the holding portion. Accordingly, it is possible to more easily perform the position adjustment of the optical compensation element.

A projector according to a second aspect of the invention includes a light source device, a light modulation device which modulates light emitted from the light source device, a projection optical device which projects light modulated by the light modulation device, and an optical compensation element adjusting mechanism according to the first aspect, and the optical compensation element adjusting mechanism is disposed between the light modulation device and the projection optical device.

According to the second aspect, it is possible to achieve the same effect as that of the optical compensation element adjusting mechanism according to the first aspect. With this, it is possible to optically compensate the light modulation device suitably and certainly and thus, contrast of an image to be projected can be improved.

In the second aspect, it is preferable that the light modulation device includes a liquid crystal panel modulating light, which is made incident, and a holding member held at a light incident side by the liquid crystal panel, the holding member is the attaching member, and the pair of fixing portions is fixed to a surface of a light emission side of the holding member.

According to the second aspect, the holding member which holds the liquid crystal panel at the light incident side is an attaching member to which fixing portions of an adjusting frame are fixed. Accordingly, the position (inclination amount) of the optical compensation element is adjusted with respect to the holding member to thereby make it possible to certainly adjust the inclination amount to the light modulation device.

In the second aspect, it is preferable that a polarizing plate disposed between the light modulation device and the projection optical device and a cooling device sending cooling air to a member which becomes a cooling target of the projector are included in the projector, and the adjusting frame has a rectifying portion which allows the cooling air sent from the cooling device to flow toward the polarizing plate.

According to the second aspect, the adjusting frame includes the rectifying portion which allows the cooling air to flow toward the polarizing plate. According to this, it is possible to allow the cooling air, which is flown toward the adjusting portion, to flow toward the polarizing plate. Accordingly, it is possible to efficiently cool the polarizing plate.

In the second aspect, it is preferable that the center axis of light emitted from the light modulation device passes through a position away from the center of the optical compensation element before the optical compensation element is inclined by the adjusting portion.

Here, the optical compensation element is rotated by using the virtual line as a rotational axis and is inclined with respect to the light modulation device. In this case, the optical compensation element is inclined in a direction in which one of corners in a diagonal relationship different from corners in the diagonal relationship in accordance with the pair of fixing portions of the optical compensation element is close to the light modulation device, and the other one of the corners is away from the light modulation device.

On the other hand, in a case where light emitted from the light modulation device is extended to follow a progressing direction of the light, light passing through the corner portion side of the optical compensation element which is away from the light modulation device is extended to the outer side than light passing through the corner portion side of the optical compensation element close to the light modulation device.

It is assumed that the optical compensation element is disposed such that the center axis of light emitted from the light modulation device is coincident with the center of the optical compensation element and the optical compensation element is formed and disposed such that all light beams emitted from the light modulation device are incident onto the optical compensation element. In this case, when the optical compensation element is inclined, an area onto which light is not incident becomes large in the corner portion of the optical compensation element which is close to the light modulation device. That is, the optical compensation element becomes large in size.

In contrast, according to the second aspect, the center axis of light emitted from the light modulation device is deviated from the center of the optical compensation element. For that reason, for example, it is configured in such a way that when the optical compensation element is inclined, light passes through the position of the corner portion side close to the light modulation device to thereby making it possible for the area onto which light is not incident to become small. Accordingly, it is possible to miniaturize the size of the optical compensation element and the holding portion and thus, the size of the optical compensation element adjusting mechanism, eventually, the projector can be miniaturized.

DESCRIPTION OF EMBODIMENTS

First Embodiment

[Schematic Configuration of Projector]

Figure 1:
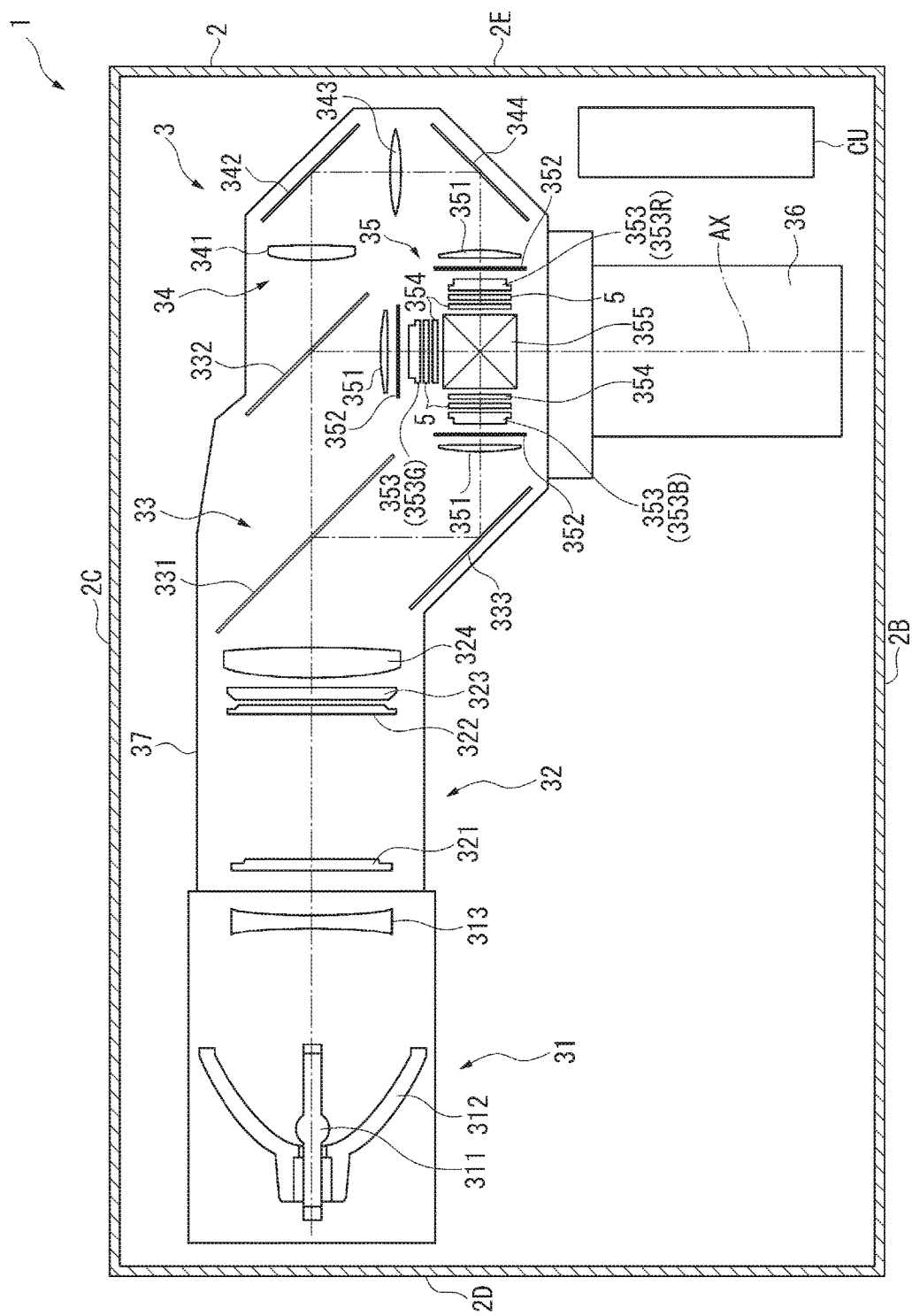
FIG. 1 is schematic diagram illustrating a configuration of a projector according to a first embodiment of the invention.

FIG. 1 is schematic diagram illustrating a configuration of a projector 1 according to a first embodiment of the invention.

The projector 1 according to the present embodiment is an image display device which modulates light emitted from a light source device 31 provided therein, forms an image according to image information, and enlarges and projects the image onto a projection surface (not illustrated) such as a screen. As illustrated in FIG. 1, the projector 1 includes an exterior casing 2 configuring exterior of the projector 1 and having an approximately rectangular shape in plan view and an optical unit 3 accommodated and disposed within the exterior casing 2. In addition to this, the projector 1 includes a control device (not illustrated) controlling the projector 1, a power supply device (not illustrated) supplying electric power to electronic components that constitute the projector 1, and a cooling device CU cooling a member which becomes a cooling target among members constituting the projector 1.

[Configuration of Exterior Casing]

The exterior casing 2 forms atop surface of the projector 1 (not illustrated), a front surface 2B, a rear surface 2C, a left side surface 2D, a right side surface 2E, and a bottom surface (not illustrated), and although illustration is omitted, a plurality of leg portions are provided in the bottom surface. The bottom surface is disposed to face downward in the vertical direction such that the projector 1 becomes a normal placing posture and the bottom surface is disposed to face upward in the vertical direction by being turned upside down compared to the normal placing posture such that the projector 1 becomes a reverse placing posture.

[Configuration of Optical Unit]

The optical unit 3 forms and projects the image according to the signal input from the control device described above.

The optical unit 3 includes a light source device 31, an illumination optical device 32, a color separation device 33, a relay device 34, an electro-optical device 35, a projection optical device 36, and a casing for optical components 37, and these components are disposed according to an illumination optical axis AX (optical axis on design).

The light source device 31 emits light to the illumination optical device 32. In the present embodiment, the light source device 31 includes a light source lamp 311 such as an ultra-high pressure mercury lamp, a reflector 312, and a collimating lens 313. However, instead of the light source lamp, a solid-state light source such as a light emitting diode (LED) or a laser diode (LD) may also be adopted, without being limited to the configuration.

The illumination optical device 32 makes the illuminance within an orthogonal surface uniform with respect to the center axis of light flux emitted from the light source device 31. The illumination optical device 32 includes a pair of multi-lenses 321 and 322, a polarization conversion element 323, and a superposed lens 324.

The color separation device 33 splits light flux incident from the illumination optical device 32 into three color light beams of red, green, and blue. The color separation device 33 has dichroic mirrors 331 and 332 and a reflection mirror 333.

The relay device 34 is provided on a light path of red light longer than light paths of green light and blue light and makes red light incident onto a field lens 351 for red light while reducing loss of light. The relay device 34 has an incident side lens 341, a relay lens 343, and reflection mirrors 342 and 344.

The electro-optical device 35 modulates respective incident color light beams of red, green, and blue and then, combines the respective color light beams to form an image. The electro-optical device 35 includes three field lenses 351, each being provided to be corresponded to each color light, three incident side polarizing plates 352, three liquid crystal panels 353 (liquid crystal panel for red light, liquid crystal panel for green light, and liquid crystal panel for blue light are respectively regarded as 353R, 353G, and 353B) as light modulation devices, three optical compensation devices 5, three emission side polarizing plates 354, and a cross dichroic prism 355 as a color combining device.

Figure 2:
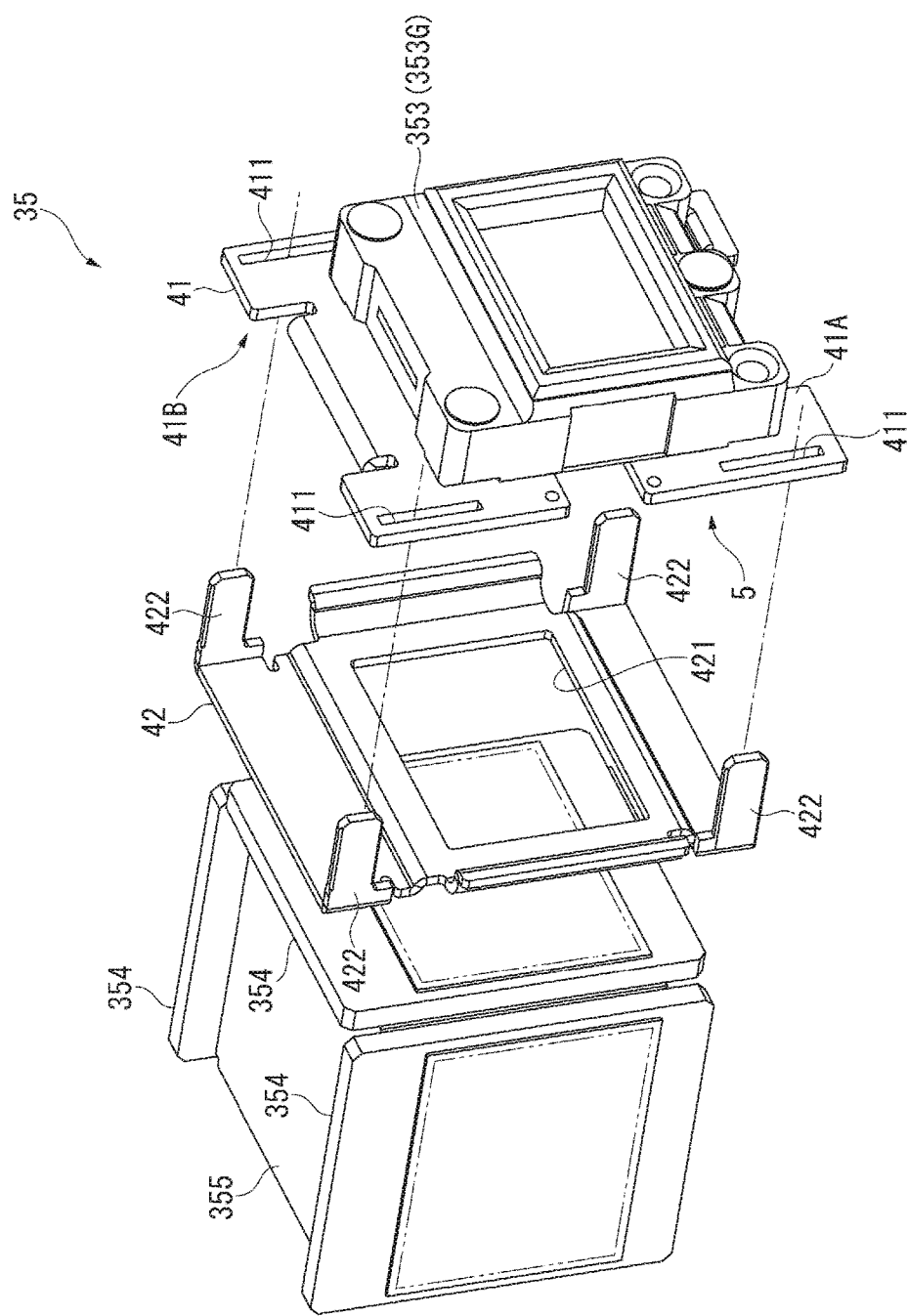
FIG. 2 is a disassembled perspective view illustrating an electro-optical device according to the first embodiment.

FIG. 2 is a disassembled perspective view illustrating a configuration of the electro-optical device 35. In FIG. 2, illustration of liquid crystal panels 353B and 353R for blue light and for red light, the optical compensation device 5, the emission side polarizing plate 354, the first holding member 41, and the second holding member 42 are omitted.

Among the constitutional elements of the electro-optical device 35, the liquid crystal panel 353, the optical compensation device 5, the emission side polarizing plate 354, and the cross dichroic prism 355 are integrated with each other by a first holding member 41 and a second holding member 42 as illustrated in FIG. 2.

Specifically, a liquid crystal panel 353 is attached to a surface 41A of the light incident side of the first holding member 41 and the optical compensation device 5 is attached to a surface 41B of the light emission side. At the approximately center of the first holding member 41, although illustration is omitted, an opening portion through which light, which is incident onto the optical compensation device 5 by passing through the liquid crystal panel 353, passes is formed.

The second holding member 42 is fixed to a corresponding light incident surface in the cross dichroic prism 355 through the emission side polarizing plates 354. At the approximately center of the second holding member 42, an opening portion 421 which makes light passing through the optical compensation device 5 incident onto the emission side polarizing plate 354, is formed. Protruding portions 422 protruding to the light incident side are formed at the four corners of the second holding member 42 and the protruding portions 422 are inserted into the approximately rectangular hole portions 411 formed at four corners of the first holding member 41. After the protruding portions 422 are inserted into the hole portions 411, adhesive is injected into the hole portions 411 so as to fix the protruding portions 422 such that the configuration described above is formed to be integrated in one piece by the first holding member 41 and the second holding member 42.

In the present embodiment, a liquid crystal panel of the VA scheme may be adopted as the liquid crystal panel 353 in the electro-optical device 35.

The optical compensation device 5 is disposed between the liquid crystal panel 353 and the emission side polarizing plate 354. The optical compensation device 5 is for compensating a phase difference generated between normal light and abnormal light due to the birefringence generated in the liquid crystal panel 353 and improving bright view characteristics of the liquid crystal panel 353. A configuration of the optical compensation device 5 will be described in detail later.

Referring back to FIG. 1, the projection optical device 36 enlarges respective color light beams (image light described above) incident from the cross dichroic prism 355 to be projected onto the projection surface described above. As the projection optical device 36, an assembled lens including a lens barrel and a plurality of lenses disposed inside the lens barrel can be exemplified.

The casing for optical components 37 accommodates respective devices 31 to 34 to be disposed to predetermined position with respect to an illumination optical axis AX which is set inside thereof.

[Configuration of Optical Compensation Device]

Figure 3:
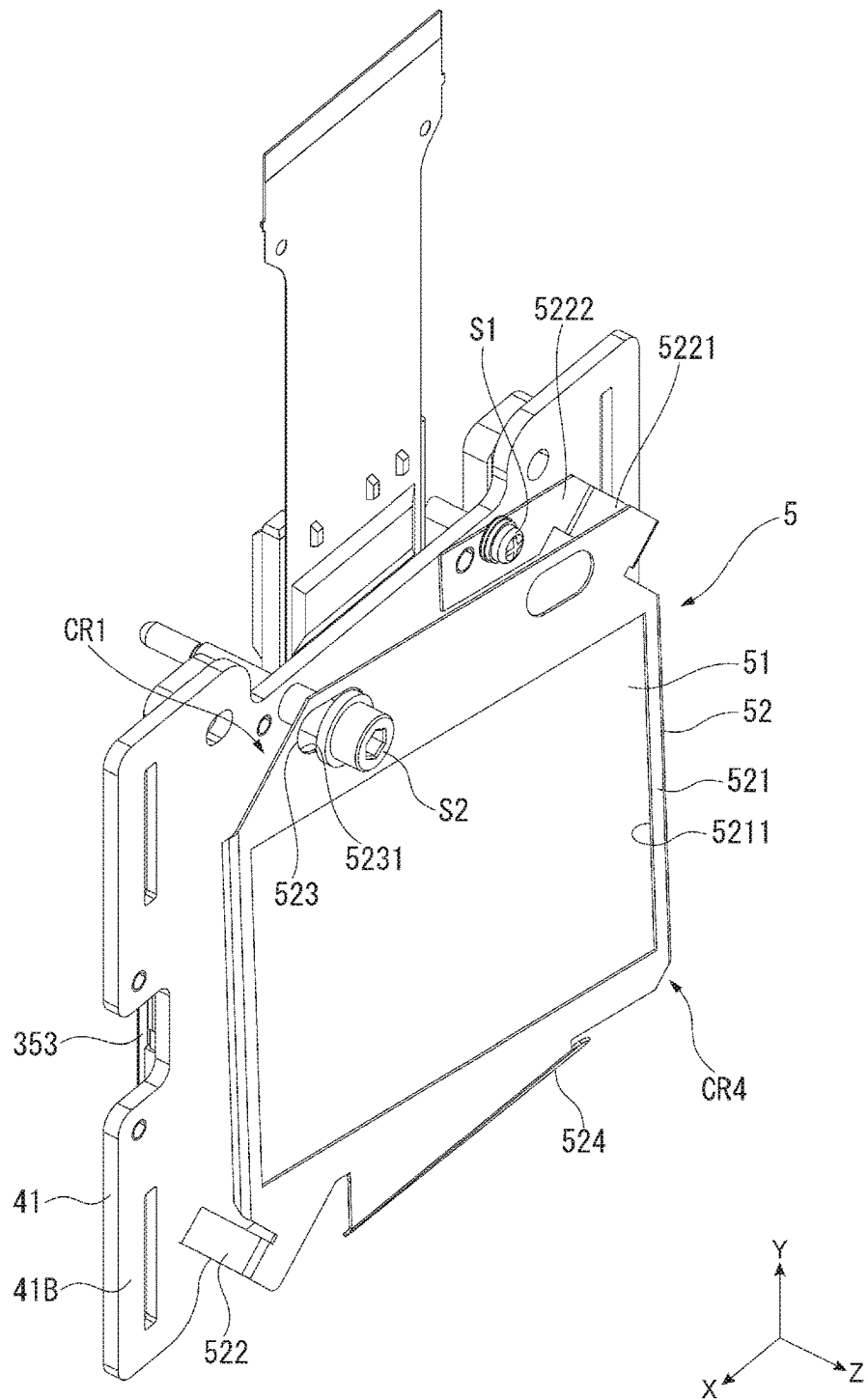
FIG. 3 is a perspective view illustrating an optical compensation device according to the first embodiment.
Figure 4:
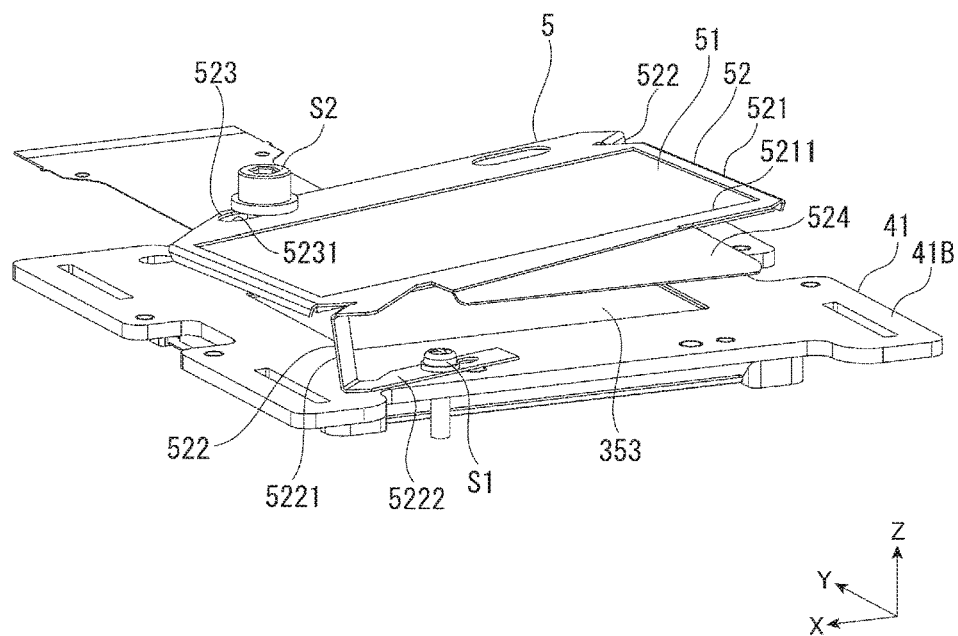
FIG. 4 is another perspective view illustrating the optical compensation device according to the first embodiment.

FIG. 3 and FIG. 4 are perspective views when the optical compensation device 5 is viewed from a light emission side. Among FIGS. 3 and 4, FIG. 3 is a perspective view when the optical compensation device 5 is viewed from the top surface side of the exterior casing 2 and FIG. 4 is a perspective view when the optical compensation device 5 is viewed from the bottom surface side of the exterior casing 2.

Each optical compensation device 5 is a device including an optical compensation element adjusting mechanism of the invention and as described above, optically compensates the corresponding liquid crystal panel 353. As illustrated in FIG. 3 and FIG. 4, each of the optical compensation devices 5 is attached to the surface 41B of the light emission side of the first holding member 41 which holds a corresponding liquid crystal panel 353.

The optical compensation device 5 includes an optical compensation element 51 and an adjusting frame 52 which holds the optical compensation element 51 and adjusts an inclination of the optical compensation element 51 with respect to the surface 41B (eventually, corresponding liquid crystal panel 353).

[Configuration of Optical Compensation Element]

In a case where light flux is obliquely incident onto the liquid crystal panel 353 (obliquely incident with respect to the normal direction of the light flux incident surface of liquid crystal panel 353), the optical compensation element 51 compensates the phase difference generated between normal light and abnormal light due to the birefringence generated in the liquid crystal panel 353. The optical axis (slow axis) of the optical compensation element 51 is inclined approximately at 45° with respect to respective end edges of the approximately rectangular optical compensation element 51.

The optical compensation element 51 can be configured by an element obtained by forming a discotic (disk-shaped) compound layer on a transparent support, for example, triacetylcellulose (TAC) through an alignment film and can adopt a WV film (manufactured by Fuji Film Corporation)).

In the following description, the Z direction indicates the progressing direction of light from the liquid crystal panel 353 toward the cross dichroic prism 355 in each color light and the X direction and the Y direction indicate direction orthogonal to the Z direction and also orthogonal to each other. In the present embodiment, in a case where the projector 1 is disposed in the normal placing posture and the Z direction follows the horizontal direction, the Y direction is regarded as a direction directing from the downstream side toward the upstream side along the vertical direction, and the X direction is regarded as a direction directing from the left side to the right side along the horizontal direction in a case where viewed along the Z direction. Furthermore, the Z direction side indicates the downstream side (tip side in Z direction) in the Z direction and a side opposite to the Z direction indicates the upstream side (base end side in Z direction) in the Z direction. Other directions are also similar.

[Configuration of Adjusting Frame]

Figure 5:
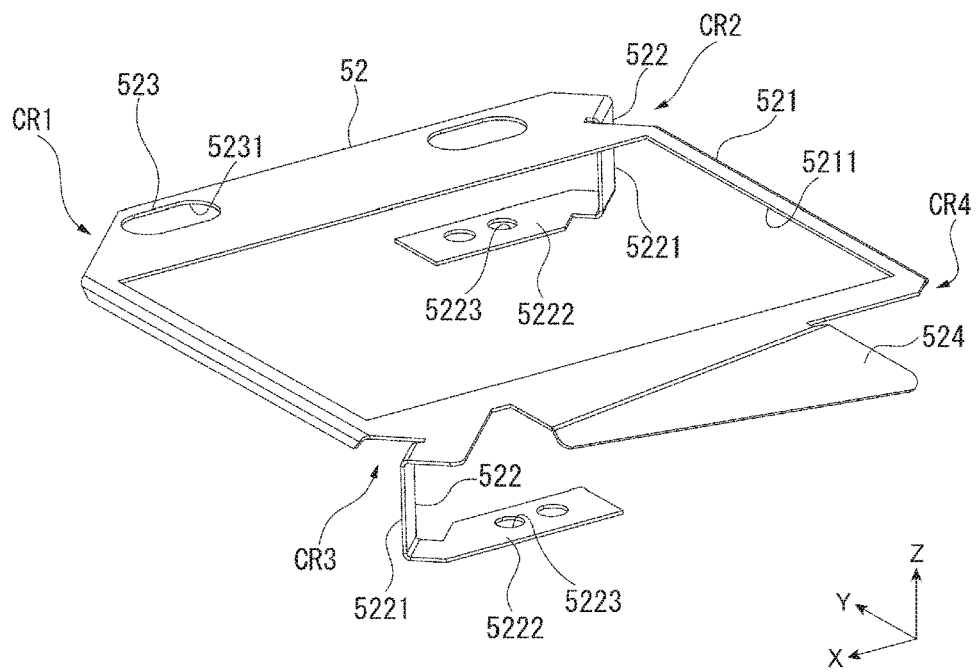
FIG. 5 is a perspective view illustrating an adjusting frame of the optical compensation device according to the first embodiment.
Figure 6:
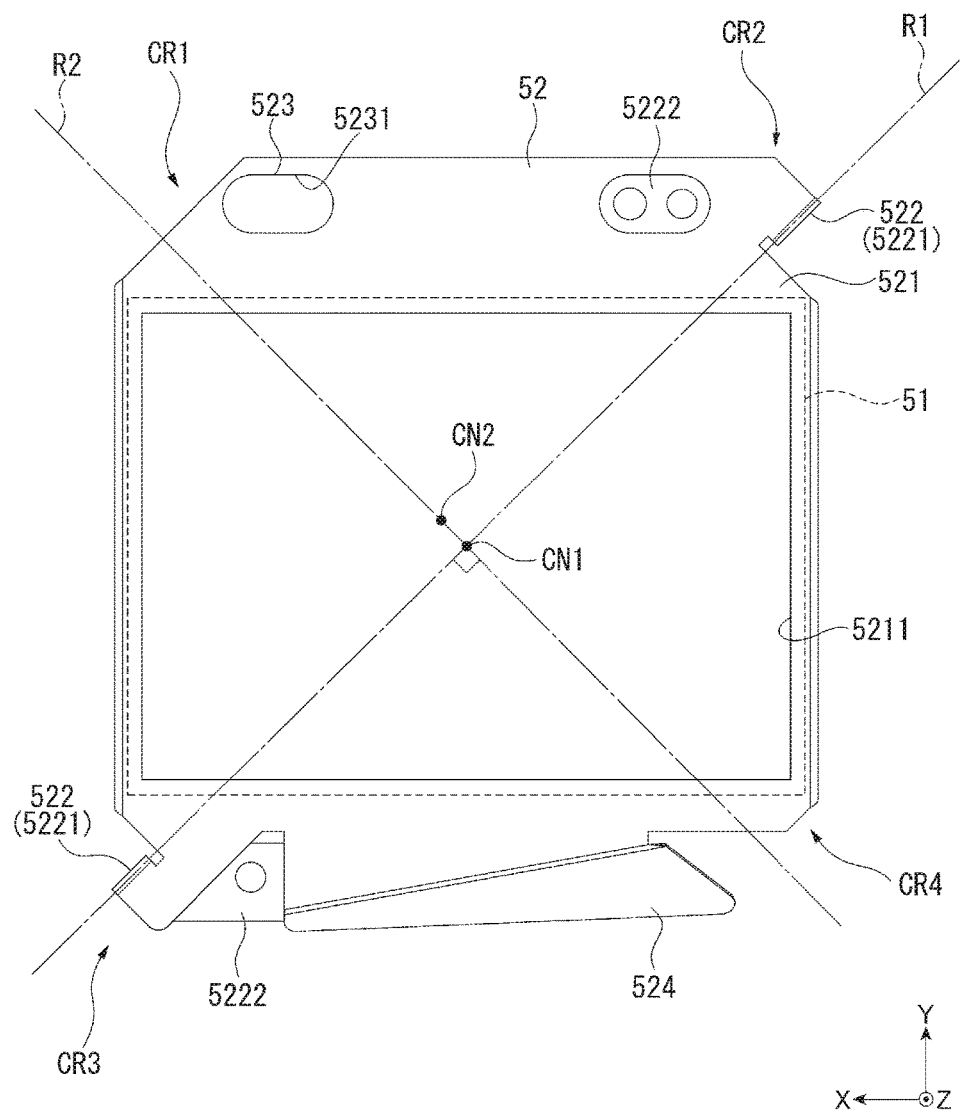
FIG. 6 is a plan view illustrating the adjusting frame of the optical compensation device according to the first embodiment.

FIG. 5 and FIG. 6 are diagrams illustrating the adjusting frame 52. Specifically, FIG. 5 is a perspective view when the adjusting frame 52 is viewed from a side opposite to the Z direction and a side opposite to the Y direction. FIG. 6 is a plan view when the adjusting frame 52 is viewed from the Z direction side.

The adjusting frame 52 is a frame which is attached to the first holding member 41 and of which an angle to the horizontal surface 41A is adjusted in a state of holding the optical compensation element 51 to thereby adjust an inclination of the optical compensation element 51 with respect to the liquid crystal panel 353. As illustrated in FIG. 3 to FIG. 6, the adjusting frame 52 includes a holding portion 521, a pair of fixing portions 522, an adjusting portion 523, and a rectifying portion 524, and is formed by folding sheet metal.

[Configuration of Holding Portion]

The holding portion 521 is a portion for holding the optical compensation element 51 and as illustrated in FIG. 6, has an approximately rectangular outer shape when viewed along the Z direction. The optical compensation element 51 is fixed to a surface (surface of light incident side) at a side opposite to the Z direction in the holding portion 521 by adhesive or the like. The holding portion 521 has a rectangular opening portion 5211 at the approximately center and light incident onto the optical compensation element 51 through the corresponding liquid crystal panel 353 passes through the opening portion 5211 and is incident onto the emission side polarizing plate 354.

[Configuration of Fixing Portion]

As illustrated in FIG. 3 to FIG. 6, each of the pair of fixing portions 522 is formed by folding a portion of the holding portion 521 and is a portion which is fixed to the surface 41B of the first holding member 41 by a screw (not illustrated) to thereby fix the adjusting frame 52 to the surface 41B.

The fixing portions 522 are corner portions in the Y direction side of the holding portion 521 among corner portions CR1 to CR4 of the approximately rectangular holding portion 521, are the corner portion CR2 at a side opposite to the X direction and a corner portion in a state of being a diagonal relationship with the corner portion CR2, and positioned in a portion at an outer edge side in the corner portion CR3 which is farthest away, that is, in the vicinity of the corner portions CR2 and CR3. Each of the fixing portions 522 has a bent portion 5221 and a fixing body portion 5222.

The bent portions 5221 are portions which are bent from the holding portions 521 and extend toward a side opposite to the Z direction, that is, the first holding member 41, and each of which is a flat plate shaped portions positioned on the same straight line in each of the fixing portion 522. The bent portions 5221 have flexibility and although details will be described later, when the holding portion 521 is inclined, the bent portions 5221 become the rotational center of the holding portion 521.

The fixing body portions 5222 are portions formed by further bending the tip of the bent portion 5221 and are formed to be approximately parallel to the surface 41B. As illustrated in FIG. 5, the fixing body portions 5222 are extended in directions opposite to each other from each of the bent portions 5221 in each of the fixing portions 522 such that the fixing body portions 5222 are covered by the holding portion 521. In each of the fixing body portions 5222, a hole portion 5223 (see FIG. 5) is formed and a screw S1 which is inserted to penetrate through the hole portion 5223 is fixed to the surface 41B such that the adjusting frame 52 is fixed to the first holding member 41.

[Configuration of Adjusting Portion]

The adjusting portion 523 is a portion which inclines the holding portion 521 with respect to the surface 41B to which the adjusting frame 52 is attached to thereby incline the optical compensation element 51 held in the holding portion 521, eventually, adjust an inclination of the optical compensation element 51 with respect to the liquid crystal panel 353. The adjusting portion 523 is configured as a portion of the holding portion 521 and more specifically, is positioned in the vicinity of the corner portion CR1 different from the corner portions CR2 and CR3, at which the pair of fixing portions 522 is positioned, in the holding portion 521.

The adjusting portion 523 has a hole portion 5231 penetrating through the holding portion 521. The adjusting portion 523 is moved in a direction of approaching the surface 41B according to an insertion amount of a screw S2 inserted into the surface 41B of the first holding member 41 by being inserted to penetrate through the hole portion 5231 to thereby incline the holding portion 521 with respect to the surface 41B, eventually, incline the optical compensation element 51.

That is, a moving amount of the adjusting portion 523 in a direction of approaching or a direction away from the surface 41B is adjusted according to the insertion amount of the screw S2 such that the inclination amount of the optical compensation element 51 is adjusted.

Here, as illustrated in FIG. 6, the fixing portion 522 is provided to be positioned on a virtual line R1 passing through the center CN1 of a rectangular opening portion 5211. More specifically, the bent portions 5221 are respectively positioned on the virtual line R1. The virtual line R1 is a straight line which is inclined approximately at 45° to respective end edges of the optical compensation element 51 having the approximately rectangular shape held in the holding portion 521 and a straight line approximately parallel to the optical axis (slow axis) of the optical compensation element 51 held in the holding portion 521. For that reason, as described above, when the holding portion 521 is inclined according to the insertion amount of the screw S2 which is inserted to penetrate through the hole portion 5231 provided in the adjusting portion 523, the rotational axis of the holding portion 521 becomes the rotational axis indicated by the virtual line R1. For that reason, it is possible to rotate the optical compensation element 51 around the slow axis.

The optical compensation element 51 is disposed such that a rubbing direction of the corresponding liquid crystal panel 353 overlaps the slow axis when viewed from a side opposite to the Z direction. For that reason, it is possible to rotate (incline) the optical compensation element 51 by regarding the slow axis as the rotational axis to thereby make it possible to suitably adjust an inclination of the optical compensation element 51.

[Positional Relationship Between Center Axis of Light Passing Through Liquid Crystal Panel and Center of Optical Compensation Element]

Here, in a stage before the optical compensation element 51 is inclined, as illustrated in FIG. 6, the center CN1 of the optical compensation element 51 is deviated with respect to a position of the center axis of light CN2 (which is the same as illumination optical axis AX) emitted from the liquid crystal panel 353 in the opening portion 5211, when viewed from a side opposite to the Z direction. More specifically, the center CN1 is positioned so as to be shifted to a corner portion side of a side opposite to a side, at which the adjusting portion 523 is positioned along a virtual line R2 orthogonal to the virtual line R1 which passes through the center CN1, with respect to the center axis CN2.

Figure 7:
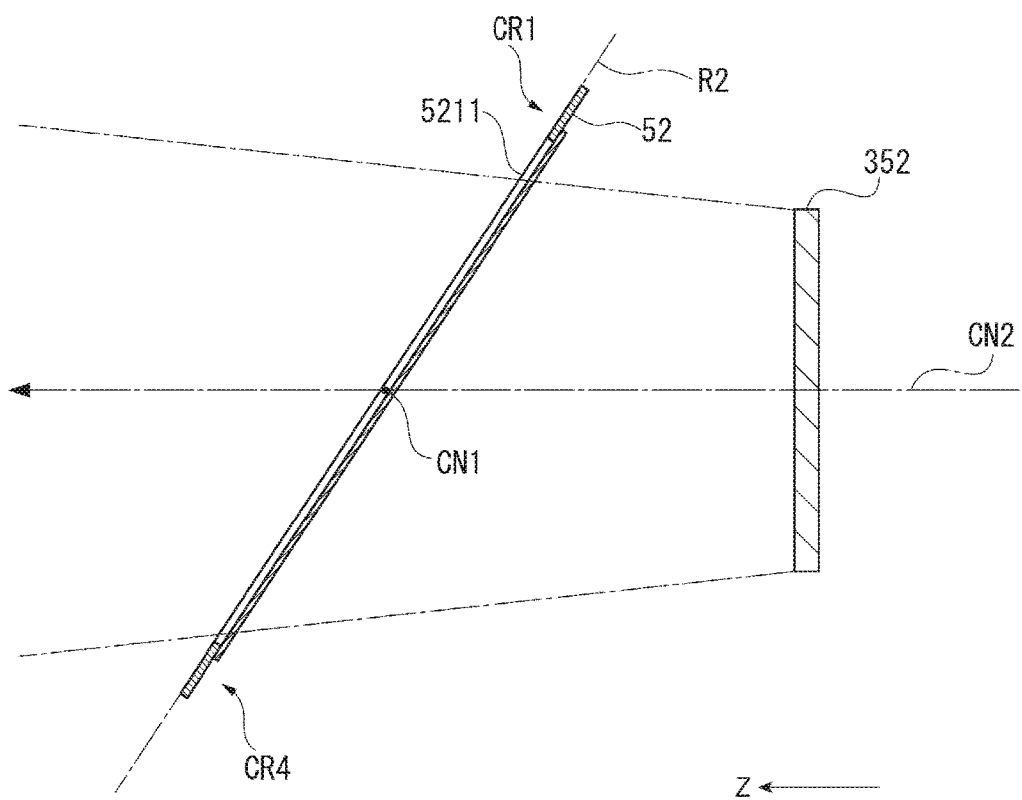
FIG. 7 is a schematic diagram illustrating a range in which light flux from a liquid crystal panel is transmitted through an optical compensation element in a case where a center of the optical compensation element is positioned on a center axis of light flux from the liquid crystal panel according to the first embodiment.
Figure 8:
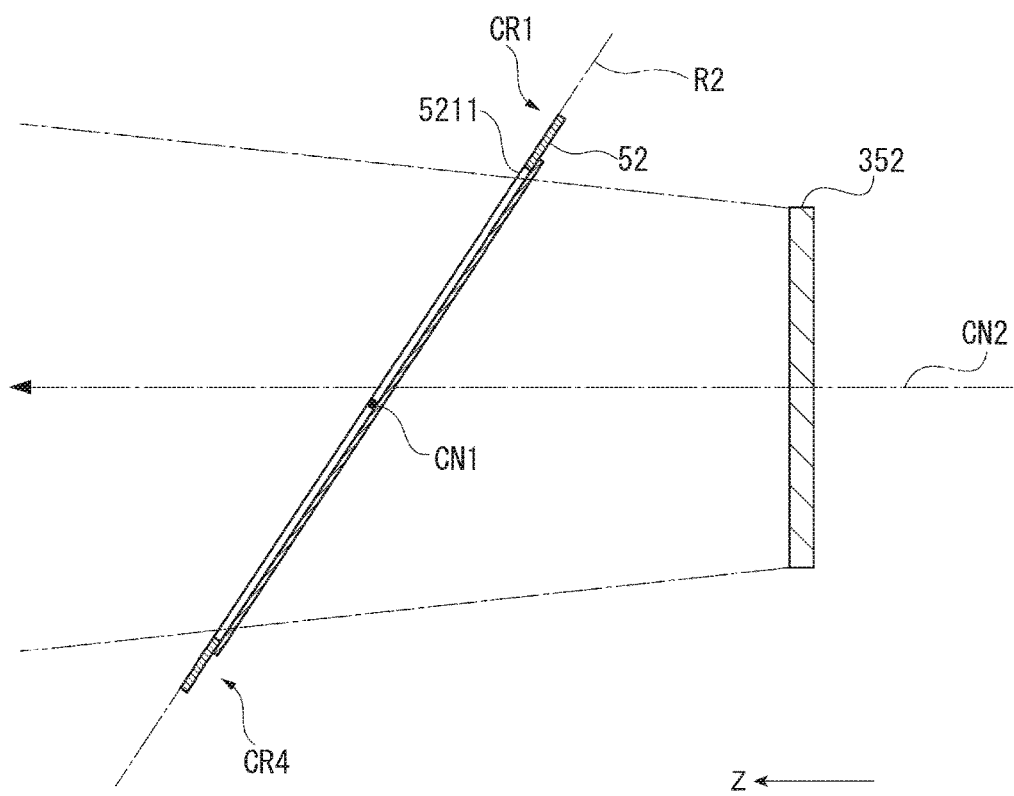
FIG. 8 is a schematic diagram illustrating a range in which light flux from liquid crystal panel is transmitted through the optical compensation element in the first embodiment.

FIG. 7 is a schematic diagram illustrating a range in which light flux emitted from the liquid crystal panel 353 is transmitted through the optical compensation element 51 in a case where the center CN1 of the optical compensation element 51 is positioned on the center axis CN2 of light flux emitted from the liquid crystal panel 353. FIG. 8 is a schematic diagram illustrating a range in which light flux emitted from the liquid crystal panel 353 is transmitted through the optical compensation element 51 in a case where the center CN1 of the optical compensation element 51 is deviated as described above with respect to the center axis CN2 of light flux emitted from the liquid crystal panel 353. In FIG. 7 and FIG. 8, the ranges when viewed along the virtual line R2 are illustrated in such away that the corner portion CR1 side becomes an upper portion and the corner portion CR4 side becomes a lower portion.

As illustrated in FIG. 7 and FIG. 8, in a case where the insertion amount of the screw S2 is adjusted to incline the optical compensation element 51 with respect to the liquid crystal panel 353, the end portion of the corner portion CR1 side is positioned at a side opposite to the Z direction and the end portion of the corner portion CR4 side is positioned at the Z direction side with respect to the center CN1 of the optical compensation element 51 in the optical compensation element 51.

Here, light emitted from the liquid crystal panel 353 is gradually extended in the Z direction. For that reason, light passing through the end portion of the corner portion CR4 side which is away from the liquid crystal panel 353 is extended to the outer side than light passing through the end portion of the corner portion CR1 side which is close to the liquid crystal panel 353. For that reason, in a state where the center CN1 of the optical compensation element 51 is positioned on the center axis CN2, when the optical compensation element 51 is formed and disposed such that all the light flux emitted from the liquid crystal panel 353 are incident onto the optical compensation element 51, as illustrated in FIG. 7, an area onto which light is not incident is increased in the end portion of the optical compensation element 51 of the corner portion CR1 side. For these reasons, in a case where the center CN1 is positioned on the center axis CN2, it is difficult to miniaturize the optical compensation element 51.

In contrast, in the present embodiment, in a case where the optical compensation element 51 is formed and disposed such that the center axis CN2 passes through the corner portion CR1 side rather than the center CN1 to cause all the light flux emitted from the liquid crystal panel 353 to be incident onto the optical compensation element 51, it is possible to reduce an area onto which light is not incident in the end portion of the optical compensation element 51 of the corner portion CR1 side as illustrated in FIG. 8. Accordingly, it is possible to miniaturize the optical compensation element 51 and the holding portion 521, eventually, miniaturize the optical compensation device 5.

In the above description, a configuration in which the center CN1 and the center axis CN2 are deviated is exemplified, but may also adopt another configuration without being limited to the configuration.

[Configuration of Rectifying Portion]

As illustrated in FIG. 4 to FIG. 6, the rectifying portion 524 is formed in such a way that the rectifying portion 524 is extended from the holding portion 521 and the tip side is bent to a side opposite to the Z direction, and rectifies the cooling air from the cooling device CU (see FIG. 1) to be directed toward the emission side polarizing plate 354.

Specifically, the rectifying portion 524 extends from the end edge held between the corner portions CR3 and CR4 to a side opposite to the Y direction in the holding portion 521 and the tip is inclined to a side (direction of approaching liquid crystal panel 353 and direction away from emission side polarizing plate 354) opposite to the Z direction.

Figure 9:
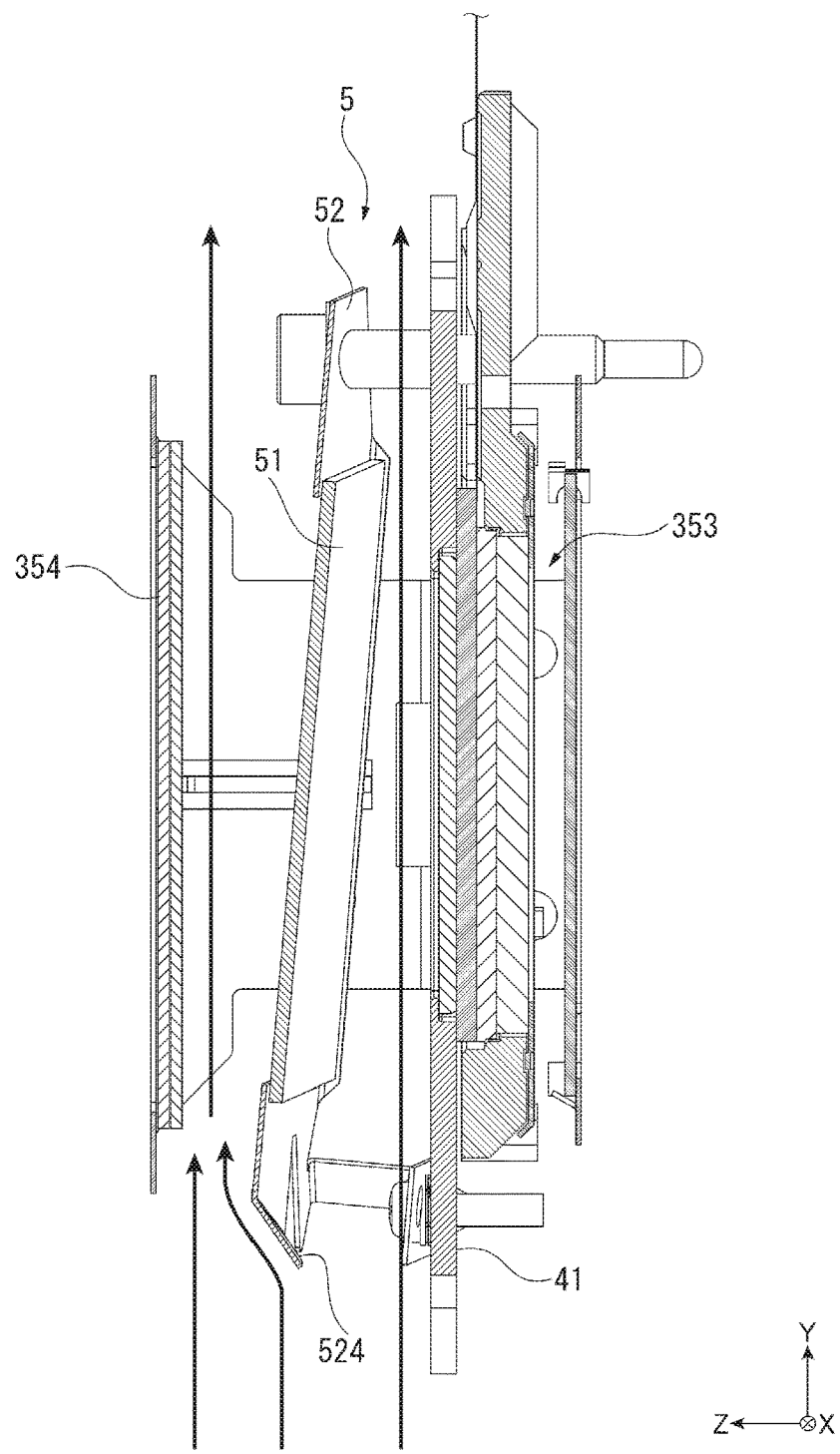
FIG. 9 is a diagram for explaining a flow of cooling air in the first embodiment.

FIG. 9 is a diagram illustrating a flow of the cooling air rectified by the rectifying portion 524.

As illustrated in FIG. 9, the rectifying portion 524 allows the cooling air delivered from the cooling device CU to flow toward the emission side polarizing plate 354. That is, the cooling air flown toward the rectifying portion 524 flows along the end surface of the light emission side in the tip portion of the rectifying portion 524 and thus, the flow direction of the cooling air becomes a direction directed toward the emission side polarizing plate 354. The cooling air directed toward the emission side polarizing plate 354 flows in the Y direction along the emission side polarizing plate 354. With this, the emission side polarizing plate 354 is cooled down.

Effects of First Embodiment

According to the projector 1 pertaining to the first embodiment described above, there are following effects.

In the present embodiment, the holding portion 521 which holds the optical compensation element 51 is fixed to the liquid crystal panel 353 side by two fixing portions 522. The holding portion 521 is rotated around the virtual line R1 by the adjusting portion 523 to thereby cause the inclination amount to the first holding member 41 as the attaching member of the holding portion 521 to be adjusted. According to this, the inclination amount of the holding portion 521 which holds the optical compensation element 51 is adjusted with respect to the first holding member 41 disposed at a suitable position to the liquid crystal panel 353 to thereby make it possible to suitably adjust the inclination amount of the optical compensation element 51 to the liquid crystal panel 353. In the configuration, the adjusting frame 52 can be configured as an integral one piece and thus, it is possible to configure the optical compensation device 5 with a simpler configuration compared to a case where the adjusting frame is configured by combining a plurality of members. Accordingly, it is possible to adjust the position of the optical compensation element 51 by the adjusting frame 52 with a simple configuration. With this, it is possible to optically compensate the liquid crystal panel 353 suitably and certainly and thus, contrast of an image to be projected can be improved.

The holding portion 521 is firmly fixed to the first holding member 41 which holds the liquid crystal panel 353 by the screw S1. With this, it is possible to reduce deviation in the position of the holding portion 521 with respect to the liquid crystal panel 353. Accordingly, variation in the position of the virtual line R1, which is the rotational axis of the holding portion 521, when adjusting the inclination amount of the optical compensation element 51, can be reduced and thus, it is possible to adjust the inclination amount with high accuracy. The variation in the position of the virtual line R1 can be reduced even after the inclination amount is adjusted and thus, it is possible to maintain the inclination of the optical compensation element.

The adjusting portion 523 is moved in the direction of approaching the first holding member 41 and with this, the holding portion 521 is inclined. In the configuration, the adjusting portion 523 is moved to the direction of approaching the first holding member 41 to thereby make is possible to simply adjust the inclination amount of the holding portion 521, eventually, the optical compensation element 51. Accordingly, it is possible to simply perform the position adjustment of the optical compensation element 51.

In the optical compensation device 5, the inclination amount of the holding portion 521 is adjusted according to the insertion amount of the screw S2 inserted into the hole portion 5231. In the configuration, when the insertion amount is increased, the adjusting portion 523 is moved in the direction of approaching the first holding member 41 (liquid crystal panel 353) and thus, the insertion amount is adjusted to thereby make it possible to finely adjust the position of the optical compensation element 51, in addition to making it possible to simply adjust the inclination amount of the optical compensation element 51. Accordingly, it is possible to finely adjust the position of the optical compensation element 51 even after the adjusting frame 52 is fixed to the first holding member 41, in addition to making it possible to easily adjust the position of the optical compensation element 51 with a simple configuration.

The screwing amount of the screw S2 is adjusted to thereby making it possible to adjust the insertion amount with higher accuracy. Accordingly, it is possible to adjust the inclination amount of the optical compensation element 51 with higher accuracy.

In the optical compensation device 5, the fixing port ions 522 are respectively provided at two corner portions CR2 and CR3, which are in a diagonal relationship, of the holding portion 521 having an approximately rectangular shape and the adjusting portion 523 is provided at another corner portion CR1. In the configuration, it is possible to separate the position of the adjusting portion 523 from the virtual line R1. With this, for example, force to rotate the holding portion 521 by using the virtual line R1 as a rotational axis is able to enlarge torque when acting on the adjusting portion 523 and thus, it is possible to easily rotate the holding portion 521. Accordingly, it is possible to more easily perform the position adjustment of the optical compensation element 51.

The pair of fixing portions 522 has the bent portions 5221 bent from the holding portions 521 and the fixing body portions 5222 extending from the tip sides of the bent portions 5221, and the fixing portions 522 are fixed to the first holding member 41 by the fixing body portion 5222. In the configuration, according to this, the bent portion 5221 is flexed to thereby making it possible to easily incline the holding portion 521. Accordingly, it is possible to more easily perform the position adjustment of the optical compensation element 51.

The bent portion 5221 is a plate shaped member disposed along the virtual line R1 in plan view when viewed from the Z direction, and it is possible to prevent the bent portion 5221 from being twisted about the Z axis. Accordingly, it is possible to prevent the virtual line R1 from being inclined and thus, the position adjustment of the optical compensation element 51 can be performed with high accuracy.

The bent portions 5221 are flexed according to the insertion amount of the screw S2 and thus the holding portion 521 and the optical compensation element 51 are prevented from being further inclined by restoring force of the bent portions 5221, and the inclination state of the holding portion 521 and the optical compensation element 51 can be maintained. In other words, the holding portion 521 takes a shape for urging the screw S2 to a direction opposite to the insertion direction according to the inclination amount and the inclination state can be maintained. Accordingly, fixation by adhesive or the like is not necessarily needed and it is possible to omit labor for utilizing adhesive when performing engagement or the like in assembly. It is not fixed by adhesive or the like and thus, it is possible to make work, for example, for a case where the inclination amount is readjusted or a case where the adjusting frame 52 is detached, easy.

The virtual line R1 as the rotational axis of the holding portion 521 is a straight line inclined approximately at 45° to respective sides of the optical compensation element 51. Here, in the present embodiment, the slow axis of the optical compensation element 51 is inclined approximately at 45° to respective sides (end edges) of the approximately rectangular optical compensation element 51. As described above, the optical compensation element 51 is disposed such that a rubbing direction of the liquid crystal panel 353 of the VA scheme overlaps the slow axis. In the present embodiment configured as described above, the virtual line R1 is the straight line inclined approximately at 45° to respective sides of the optical compensation element 51 to thereby make it possible to rotate the optical compensation element 51 by using the slow axis of the optical compensation element 51 as a rotational axis. Accordingly, it is possible to suitably and certainly adjust the position of the optical compensation element 51 with respect to the liquid crystal panel 353.

When the holding portion 521 is inclined, the center axis of light CN2 emitted from the light modulation device passes through a position away from the center CN1 of the optical compensation element 51. In the present embodiment, when the holding portion 521 is inclined, the adjusting frame 52 is fixed to the first holding member 41 such that the center axis CN2 passes through the position which is closer to the liquid crystal panel 353 rather than the center CN1 in the opening portion 5211. In the configuration, as described above, it is possible to make an area through which light, emitted from the liquid crystal panel 353 among the opening portion 5211, does not pass smaller compared to a case where the center axis CN2 and the center CN1 are disposed to be coincident with each other and thus, the optical compensation element 51 and the holding portion 521 can be miniaturized. Accordingly, it is possible to miniaturize the optical compensation device 5, eventually, the projector 1.

The adjusting frame 52 includes the rectifying portion 524 which causes the cooling air to flow toward the emission side polarizing plate 354. According to this, it is possible to direct the cooling air flowing toward the adjusting portion 523 toward the emission side polarizing plate 354. Accordingly, it is possible to efficiently cool down the emission side polarizing plate 354.

Second Embodiment

Next, a second embodiment of the invention will be described.

Although the projector according to the present embodiment has a configuration similar to the projector 1, the projector is different from the projector 1 in that a configuration of the optical compensation device is different, in addition to the matters that shapes of the first holding member and the second holding member constituting the electro-optical device are different. In the following description, the same or approximately the same portions as portions described already are assigned the same reference numerals, and descriptions thereof will be omitted.

Figure 10:
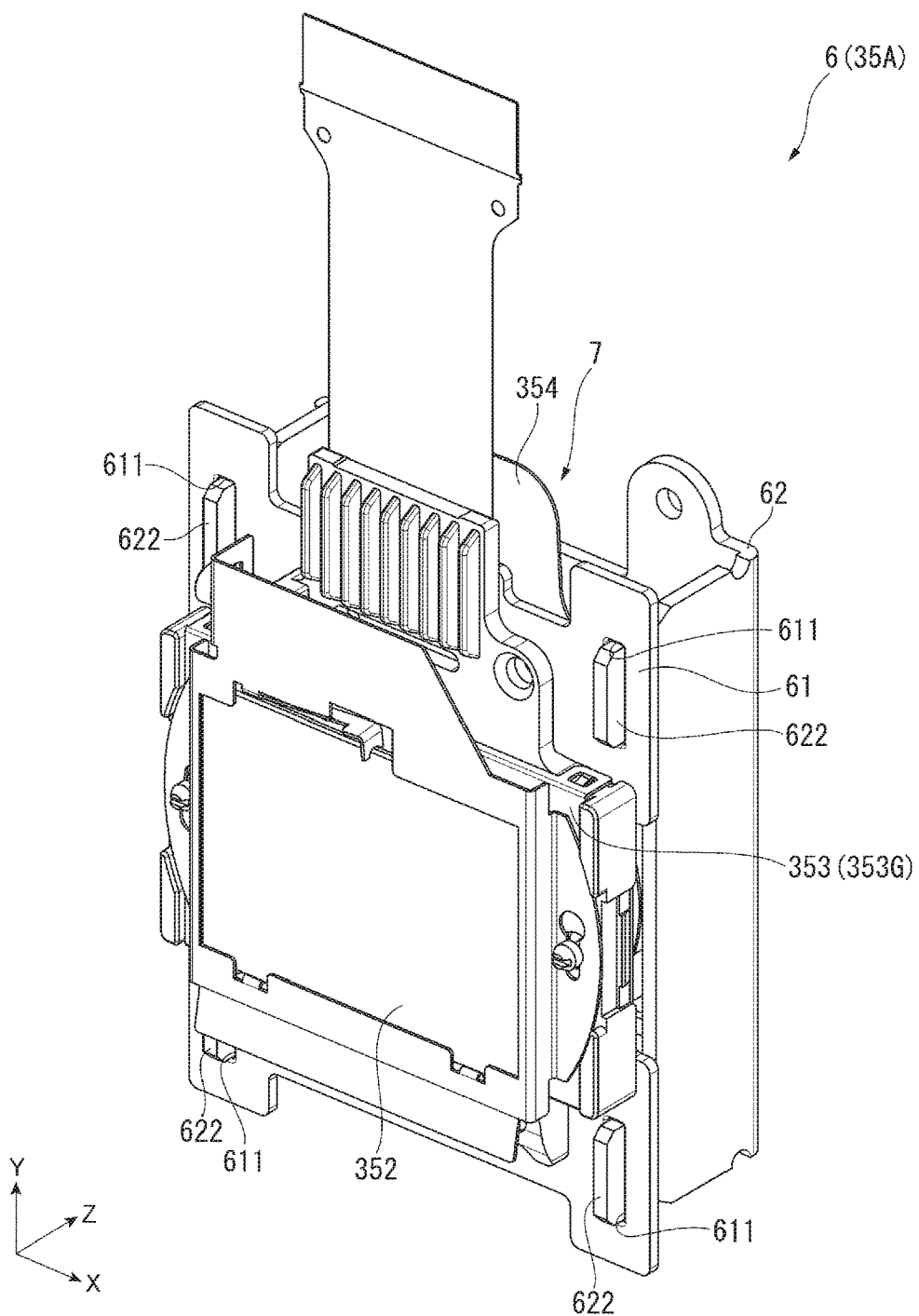
FIG. 10 is a perspective view when an image forming portion constituting an electro-optical device according to a second embodiment is viewed from an incident direction side of light.
Figure 11:
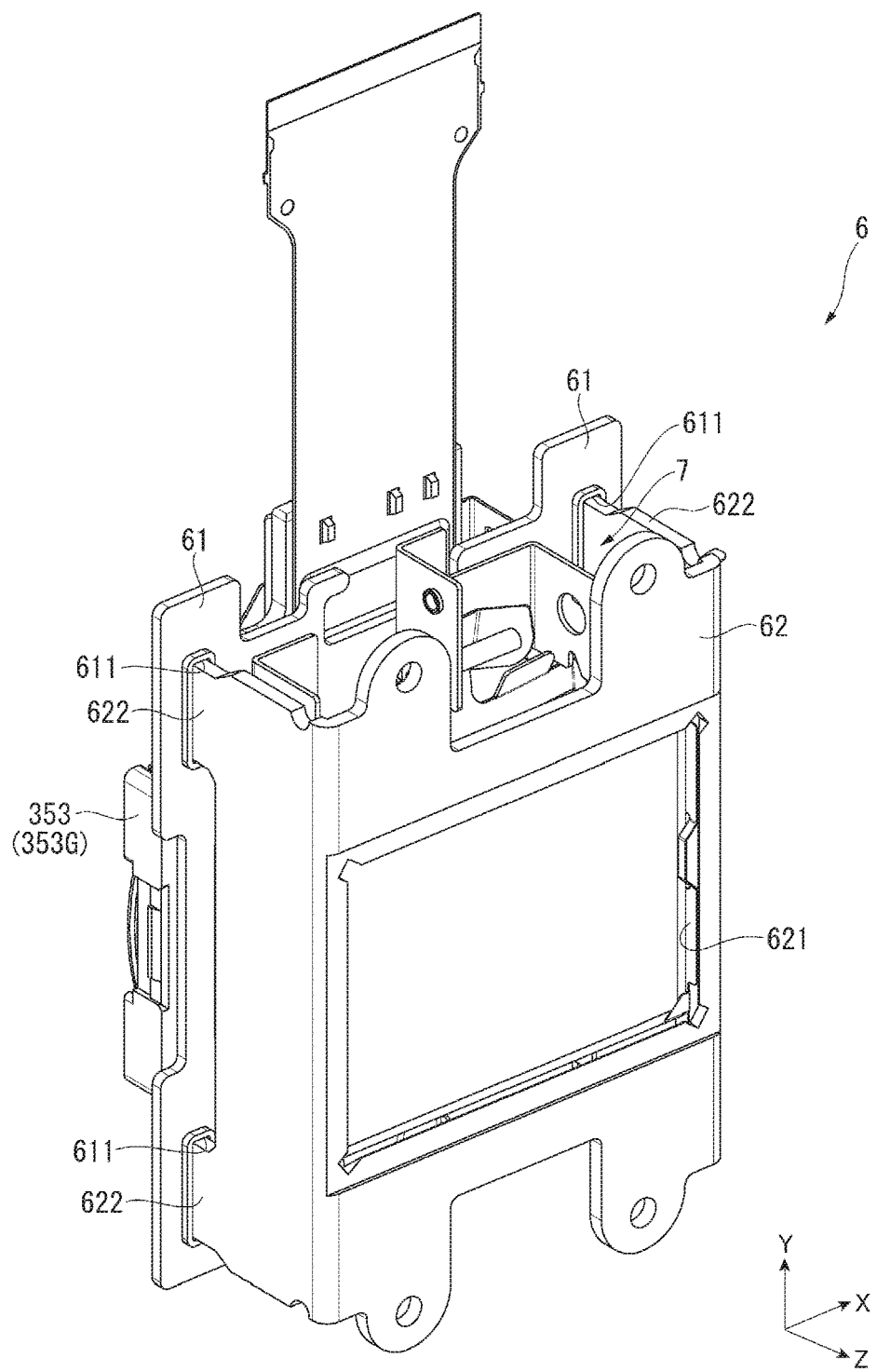
FIG. 11 is a perspective view when an image forming portion according to the second embodiment is viewed from an emission direction side of light.
Figure 12:
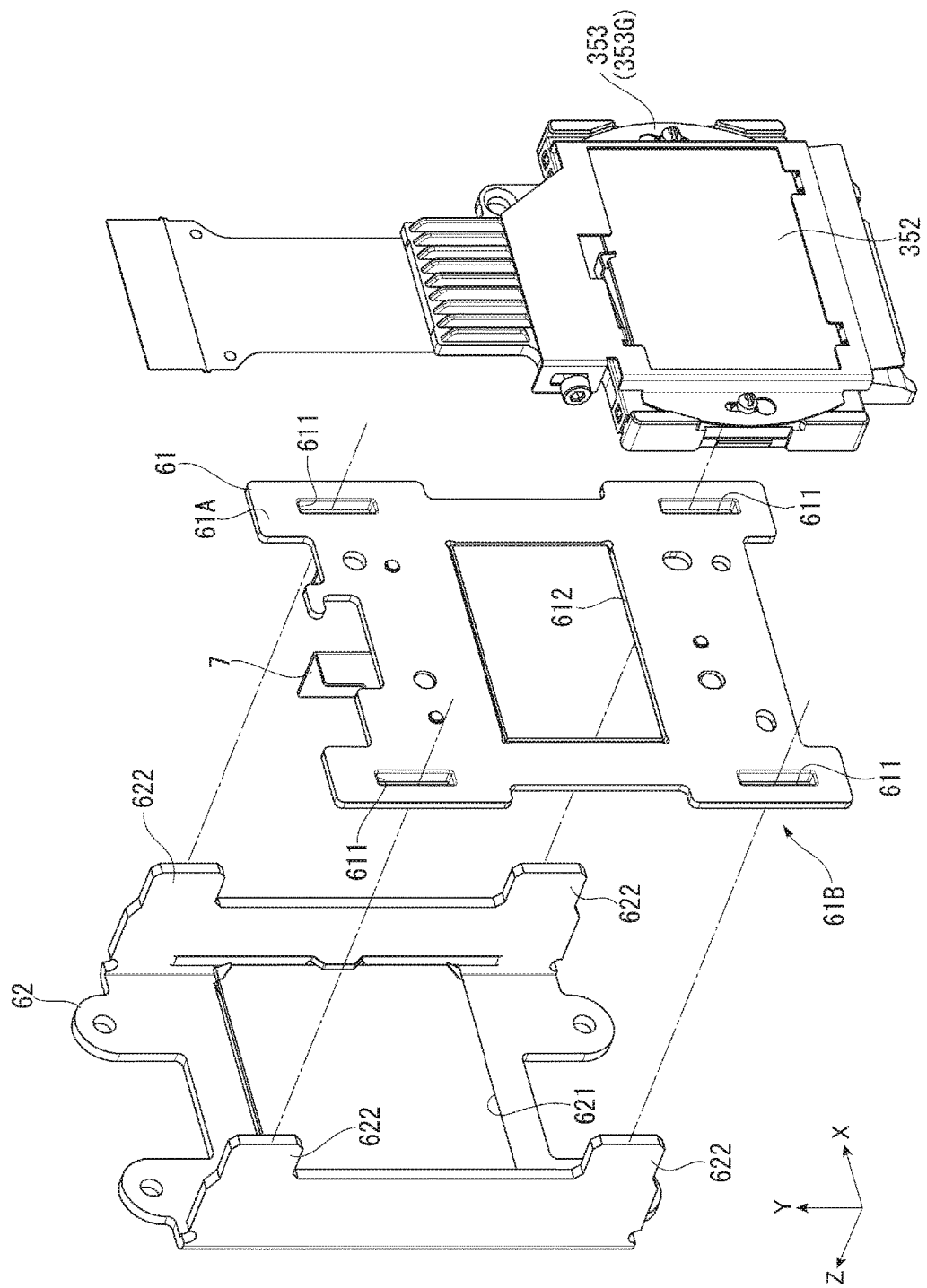
FIG. 12 is a disassembled perspective view of the image forming portion according to the second embodiment.

FIG. 10 is a perspective view when an image forming portion 6 constituting an electro-optical device of the projector according to the present embodiment is viewed from an incident side of light. FIG. 11 is a perspective view when the image forming portion 6 is viewed from an emission side of light, and FIG. 12 is a disassembled perspective view of the image forming portion 6. In FIG. 10 to FIG. 12, similar to FIG. 2, illustration of liquid crystal panels 353B and 353G for blue light and red light, the optical compensation device 7, the emission side polarizing plate, the first holding member 61, and the second holding member 62 is omitted.

The projector according to the present embodiment has the same configuration and function as those of the projector 1, in addition to including an electro-optical device 35A instead of the electro-optical device 35. The electro-optical device 35A has the same configuration and function as those of the electro-optical device 35 except that a first holding member 61, a second holding member 62, and the optical compensation device 7 are provided, instead of the first holding member 41, the second holding member 42, and the optical compensation device 5. That is, the electro-optical device 35A is provided with the incident side polarizing plate 352, the liquid crystal panel 353, the emission side polarizing plate 354 (see FIG. 22), the first holding member 61, the second holding member 62, the optical compensation device 7, and the cross dichroic prism 355 provided for each color light described above.

Among these components, the first holding member 61 has approximately the same shape as the first holding member 41 and hole portions 611 having an approximately rectangular shape are formed at four corner portions of the first holding member 61. The liquid crystal panel 353 is attached to a surface 61A of a light incident side of the first holding member 61 and the optical compensation device 7 is attached to a surface 61B of the light emission side. An opening portion 612 through which light, which has passed through the liquid crystal panel 353 and incident onto the optical compensation device 7, passes through is formed at an approximately center of the first holding member 61 as illustrated in FIG. 12.

The second holding member 62 has approximately the same shape as the second holding member 42 and protruding portions 622 protruding to the light incident side are formed at four corner portions of the second holding member 62.

The second holding member 62 is fixed to a corresponding light incident surface in the cross dichroic prism 355. An opening portion 621 which allows light, which has passed through the optical compensation device 7 and the emission side polarizing plate 354, to be incident onto the cross dichroic prism 355, is formed at an approximately center of the second holding member 62. The protruding portions 622 of the second holding member 62 are inserted into the hole portions 611 having an approximately rectangular shape and formed at four corner portions of the first holding member 61. The protruding portions 622 are inserted into the hole portions 611 and then adhesive is injected into the hole portion 611 so as to fix the protruding portions 622 such that the configuration described above is formed to be integrated in one piece by the first holding member 61 and the second holding member 62.

[Configuration of Optical Compensation Device]

Figure 13:
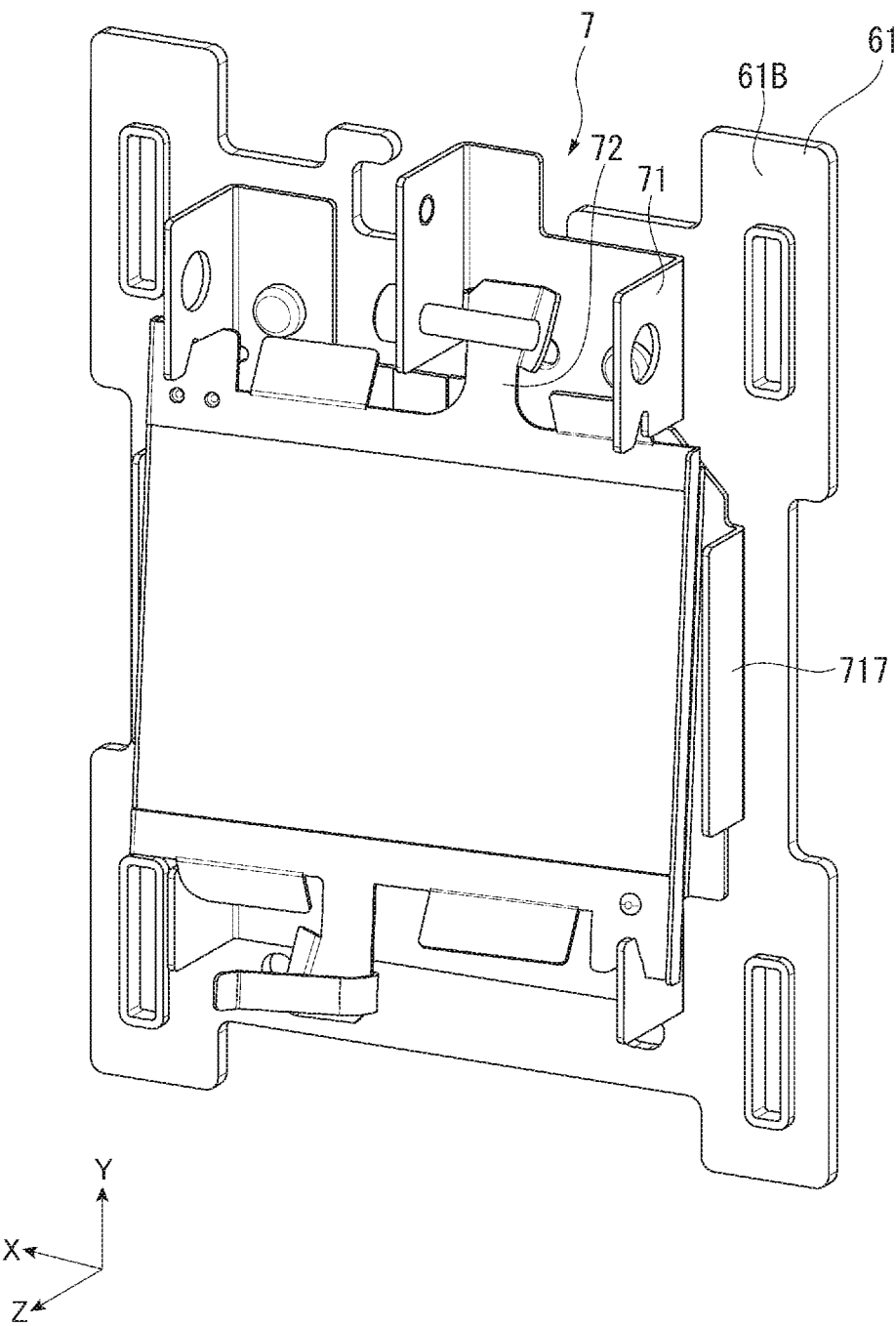
FIG. 13 is a perspective view when an incident side polarizing plate, an optical compensation device, and a first holding member according to the second embodiment are viewed from the emission direction side of light.
Figure 14:
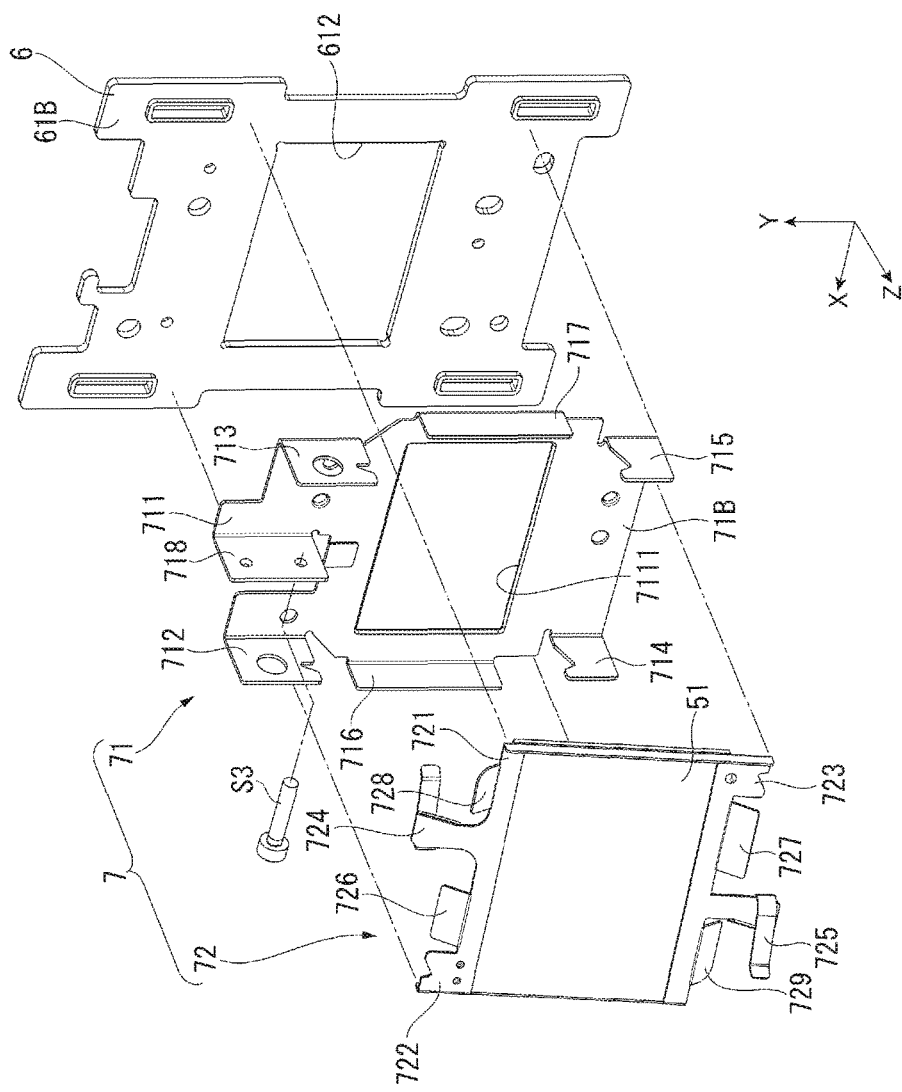
FIG. 14 is a disassembled perspective view of the optical compensation device according to the second embodiment.

FIG. 13 is a perspective view when the optical compensation device 7 and the first holding member 61 are viewed from an emission side of light and FIG. 14 is a disassembled perspective view of the optical compensation device 7 and the first holding member 61 of FIG. 13.

Each of the respective optical compensation devices 7 provided for each color light is a device including an optical compensation element adjusting mechanism of the invention and as described above, optically compensates a corresponding liquid crystal panel 353. Each of the optical compensation devices 7, as illustrated in FIG. 13 and FIG. 14, includes the optical compensation element 51, an attaching member 71 attached to the first holding member 61, and an adjusting frame 72 which holds the optical compensation element 51 and adjusts the inclination of the optical compensation element 51 with respect to the surface 41B (eventually, the corresponding liquid crystal panel 353). Each optical compensation device 7 is attached to the surface 61B of the light emission side of the first holding member 61 which holds the corresponding liquid crystal panel 353.

[Configuration of Adjusting Frame]

Figure 15:
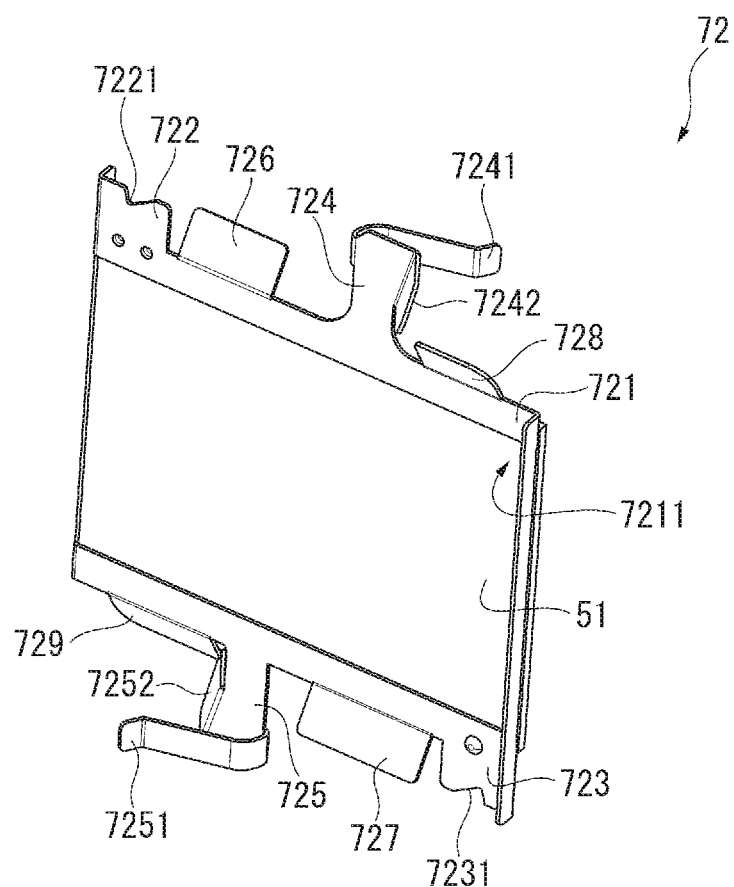
FIG. 15 is a perspective view illustrating an adjusting frame constituting the optical compensation device according to the second embodiment.
Figure 16:
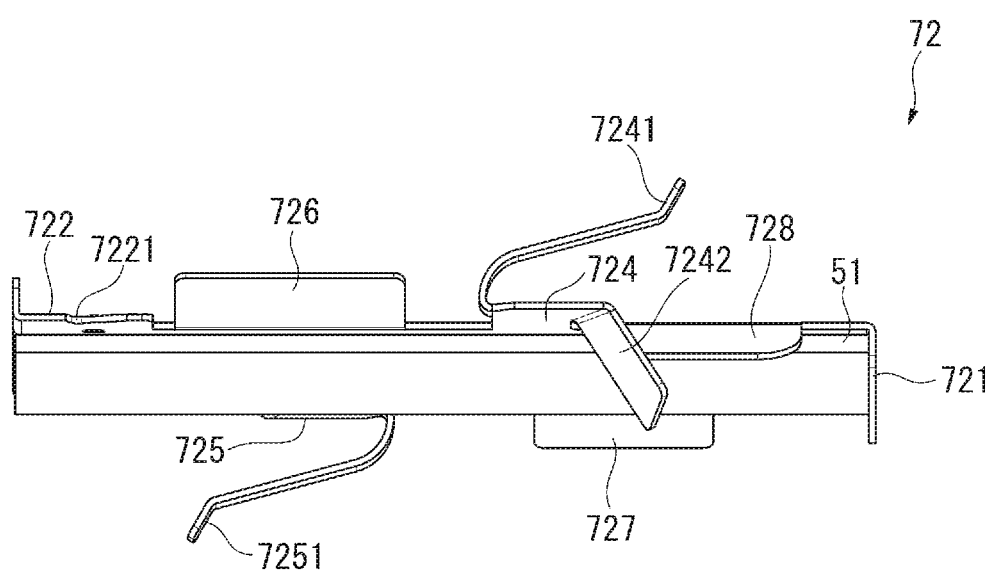
FIG. 16 is a side view illustrating the adjusting frame according to the second embodiment.
Figure 16:
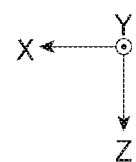

FIG. 15 is a perspective view when the adjusting frame 72 is viewed from the Z direction side and FIG. 16 is a plan view when the adjusting frame 72 is viewed from the Y direction side.

The adjusting frame 72 is attached to the attaching member 71. An inclination with respect to the liquid crystal panel 353 of the optical compensation element 51 held in the adjusting frame 72 is adjusted by adjusting an angle of the adjusting frame 72 with respect to a surface 71A.

The adjusting frame 72, as illustrated in FIG. 14 to FIG. 16, includes a holding portion 721, a pair of fixing portions 722 and 723, a pair of adjusting portions 724 and 725 and rectifying portions 726, 727, 728, and 729, and is formed by folding sheet metal.

[Configuration of Holding Portion]

The holding portion 721 is a portion for holding the optical compensation element 51 and as illustrated in FIG. 15, has an approximately rectangular outer shape when viewed along the Z direction. The optical compensation element 51 is fixed to a surface (surface of light incident side) at a side opposite to the Z direction in the holding portion 721 by adhesive or the like. The holding portion 721 has a rectangular opening portion 7211 at the approximately center and light incident onto the optical compensation element 51 through the corresponding liquid crystal panel 353 passes through the opening portion 7211 and is incident onto the emission side polarizing plate 354.

[Configuration of Fixing Portion]

As illustrated in FIG. 15 and FIG. 16, the pair of fixing portions 722 and 723 is disposed at positions, which are in an approximately diagonal relationship, of the holding portion 721. Specifically, the pair of fixing portions 722 and 723 is formed at an end portion of the X direction side in an edge portion of the Y direction side of the holding portion 721 and an end portion of a side of a direction opposite to the X direction in an edge portion of a direction opposite to the Y direction of the holding portion 721.

Among these, a notch 7221 is formed in the edge portion of the Y direction side in the fixing portion 722 and a notch 7231 is formed in the edge portion of the side in the direction opposite to the Y direction of the fixing portion 723. The notches 7221 and 7231 are engaged with any one of notches 7121, 7131, 7141, and 7151 of protruding portions 712 to 715 which will be described later (see FIG. 17).

Although details will be described later, the notches 7221 and 7231 of the fixing portions 722 and 723 become rotation centers of the holding portion 721 when the holding portion 721 is inclined.

[Configuration of Adjusting Portion]

The pair of adjusting portions 724 and 725 together with a screw S3, which will be described later, is portions which incline the holding portion 721 with respect to a surface 71B of the attaching member 71 to which the adjusting frame 72 is attached to thereby incline the optical compensation element 51 held in the holding portion 721, eventually, adjust the inclination of the optical compensation element 51 with respect to the liquid crystal panel 353.

The pair of adjusting portions 724 and 725, as illustrated in FIG. 15 and FIG. 16, is formed to be extended to the outer side from the outer peripheral portion of the holding portion 721 (adjusting frame 72). Specifically, the adjusting portion 724 is formed at a side of a direction opposite to the X direction in the edge portion of the Y direction side of the holding portion 721. The adjusting portion 725 is formed at an X direction side in the edge portion of a side of a direction opposite to the Y direction of the holding portion 721.

Among the pair of adjusting portions 724 and 725, the adjusting portion 724, as illustrated in FIG. 15 and FIG. 16, includes a first abutting portion 7241 and a second abutting portion 7242 and the adjusting portion 725 includes a first abutting portion 7251 and a second abutting portion 7252. Among these, the first abutting portions 7241 and 7251 are portions abutting on the surface 71B of the attaching member 71. The first abutting portion 7241 is formed in an approximately U-shape and has flexibility. Specifically, the first abutting portion 7241 protrudes to a side of a direction opposite to the Z direction in an approximately U-shape and the first abutting portion 7251 protrudes to a side of a direction opposite to the Z direction in an approximately U-shape.

The second abutting portions 7242 and 7252 are portions abutting onto the screw S3 which will be described later. The second abutting portions 7242 and 7252 are formed in a plate shape protruding to the side of the opposite direction to the first abutting portions 7241 and 7251 from the end portions of the first abutting portions 7241 and 7251.

That is, the pair of adjusting portions 724 and 725 is formed in the same shape and approximately in the point symmetric with respect to the optical compensation element 51 (center of optical compensation element 51).

[Configuration of Rectifying Portion]

The rectifying portions 726, 727, 728, and 729 are formed in such a way that the rectifying portions 726, 727, 728, and 729 are extended from the holding portion 721 and the tip sides are bent to the Z direction and a direction opposite to the Z direction, and rectifies the cooling air from the cooling device CU (see FIG. 1) to be directed toward the emission side polarizing plate 354 positioned at the light emission side of the adjusting frame 72.

Figure 17:
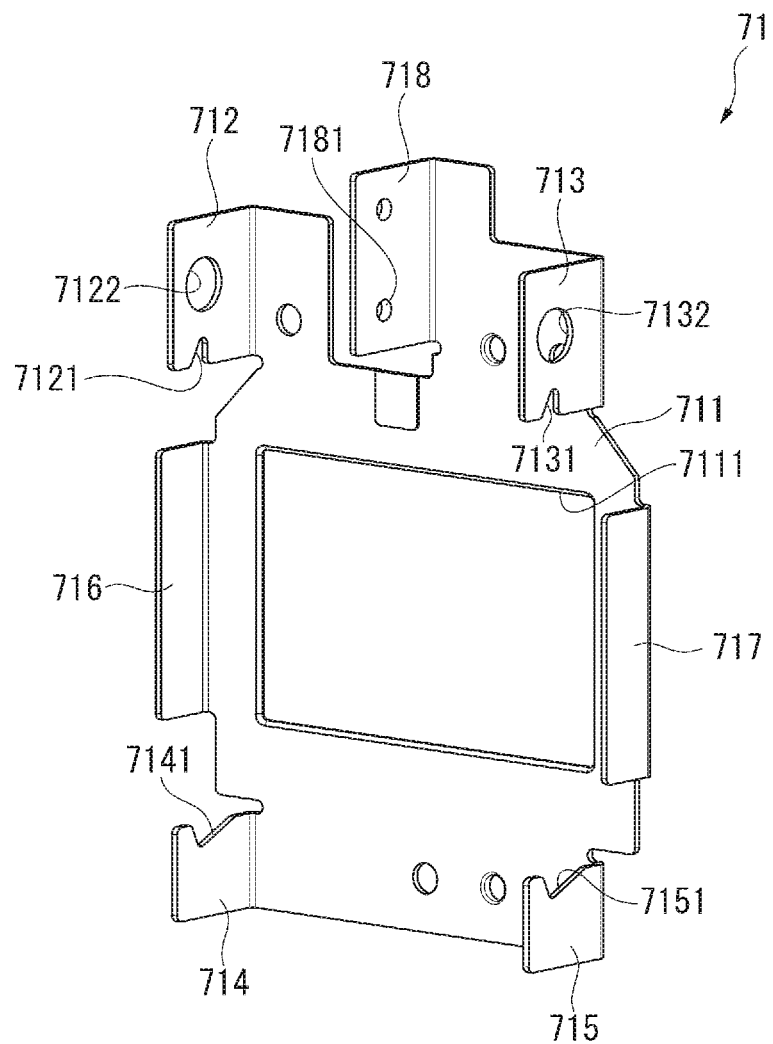
FIG. 17 is a perspective view of an attaching member constituting the optical compensation device according to the second embodiment.

Among the rectifying portions 726 to 729, the rectifying portion 726 is formed between the fixing portion 722 and the adjusting portion 724 and is inclined to the side in the direction opposite to the Z direction. The rectifying portion 727 is formed between the fixing portion 723 and the adjusting portion 725 and is inclined to the Z direction side. That is, the rectifying portion 726 and the rectifying portion 727, as illustrated in FIG. 16 and FIG. 17, are formed in approximately point symmetric with respect to the optical compensation element 51 (specifically, center of optical compensation element 51 and center of adjusting frame 72) held by the adjusting frame 72.

The rectifying portion 728 is formed at a side in the direction opposite to the X direction of the adjusting portion 724, that is, a side in the direction opposite to the X direction in the edge portion of the Y direction side of the holding portion 721, and is inclined to the Z direction side. Similar to this, the rectifying portion 729 is formed at a side of the X direction of the adjusting portion 725, that is, a side of the X direction in the end portion of a side in the direction opposite to the Y direction side of the holding portion 721, and is inclined to a direction opposite to the Z direction side. That is, as illustrated in FIG. 15 and FIG. 16, the rectifying portion 727 and the rectifying portion 728 are formed in point symmetric with respect to the optical compensation element 51 (center of optical compensation element 51).

Furthermore, dimensions along the X direction and the Y direction of the rectifying portions 726 and 727 are larger than dimensions along the X direction and the Y direction of the rectifying portions 728 and 729.

Rectifying of cooling air by the rectifying portions 726, 727, 728, and 729 will be described later in detail.

[Configuration of Attaching Member]

FIG. 17 is a perspective view when the attaching member 71 is viewed from the Z direction side.

The attaching member 71, as illustrated in FIG. 13 and FIG. 14, is attached to the surface 61B of the Z direction side of the first holding member 61 and has a function of holding the adjusting frame 72. The attaching member 71, as illustrated in FIG. 14 and FIG. 17, includes a main body portion 711, and protruding portions 712, 713, 714, 715, 716, 717, and 718.

An opening portion 7111 having approximately the same shape as the opening portion 612 of the first holding member 61 described above is formed at the approximately center portion of the main body portion 711 having an approximately rectangular shape among the portions. The adjusting frame 72 to which the optical compensation element 51 is attached is disposed inside the attaching member 71 and thus, light incident from the opening portion 612 is incident to the optical compensation element 51 through the opening portion 7111.

Each of the protruding portions 712 to 718, as illustrated in FIG. 17, is a plate shaped portion protruding from the main body portion 711 in the Z direction and is formed by bending, for example, sheet metal.

Among these, the protruding portions 712 and 713 are formed at both end portions of the main body portion 711 in the Y direction side and the notches 7121 and 7131 are formed at the side in the direction opposite to the Y direction of the protruding portions 712 and 713. Opening portions 7122 and 7132 are formed at an approximately center portion of the protruding portions 712 and 713. The opening portions 7122 and 7132 are formed in a size with which a tool (for example, tip portion of driver) rotating the screw S3 (see FIG. 14), which will be described later, is capable of being inserted through the opening portions 7122 and 7132.

The protruding portions 714 and 715 are formed at both end portions of a side opposite to the Y direction in the main body portion 711 and notches 7141 and 7151 are formed in the Y direction side of the protruding portions 714 and 715. The notches 7141 and 7151 and the notches 7121 and 7131 engage with notches 7221 and 7231 of the fixing portions 722 and 723 of the adjusting frame 72 which will be described later.

The protruding portions 716 and 717 are formed at both side portions of the approximately center portion of the main body portion 711.

The protruding portions 712 to 715 correspond to a plurality of engagement portions of the invention.

The protruding portion 718, as illustrated in FIG. 14 and FIG. 17, is formed between the protruding portions 712 and 713 in the main body portion 711. A hole portion 7181 into which the screw S3 is screwed is formed in the protruding portion 718 and the screw S3 is screwed into the hole portion 7181 such that the screw S3 is moved along the X direction (see FIG. 18).

Figure 18:
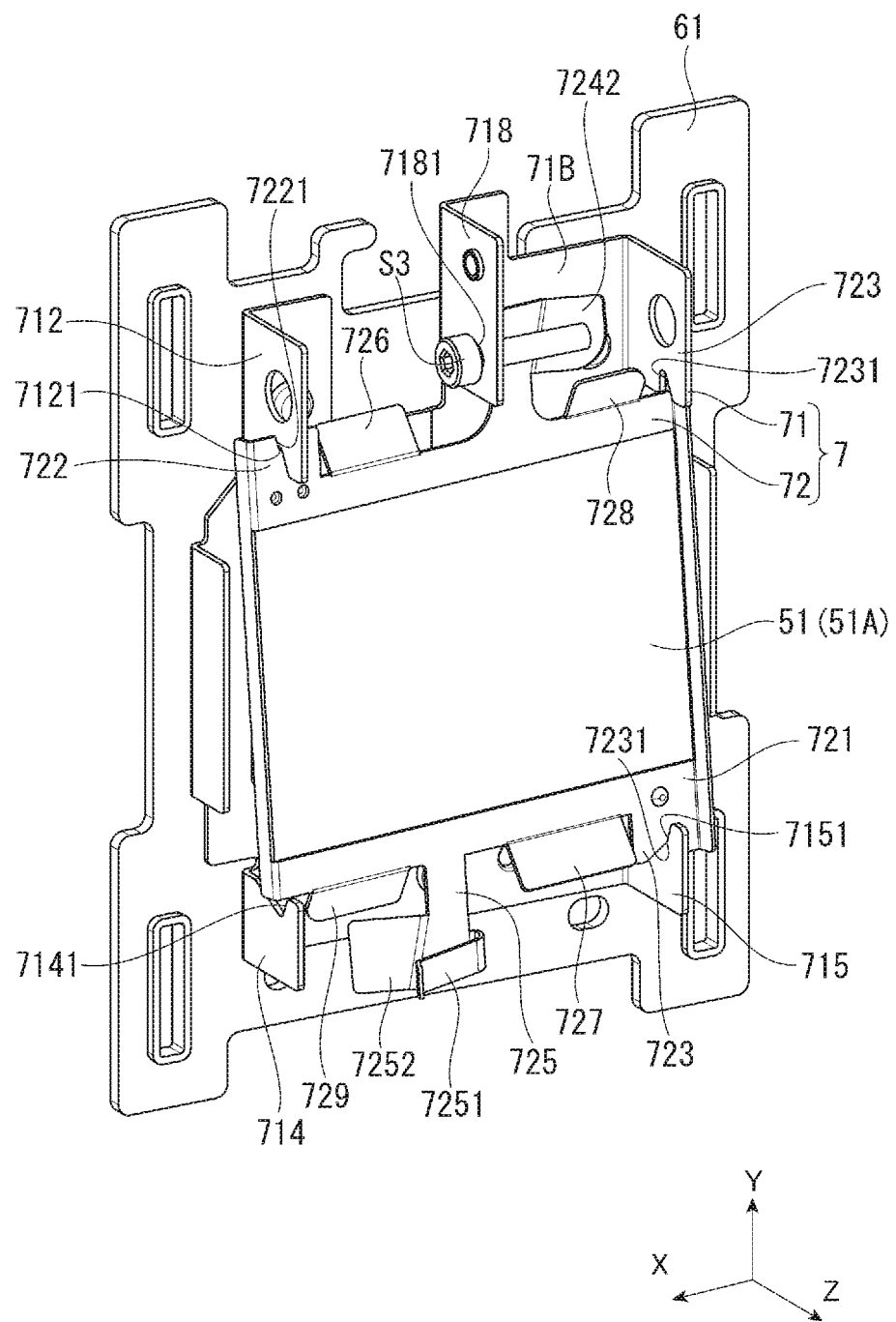
FIG. 18 is a perspective view illustrating a state where the adjusting frame and the screw are attached to the attaching member according to the second embodiment.
Figure 19:
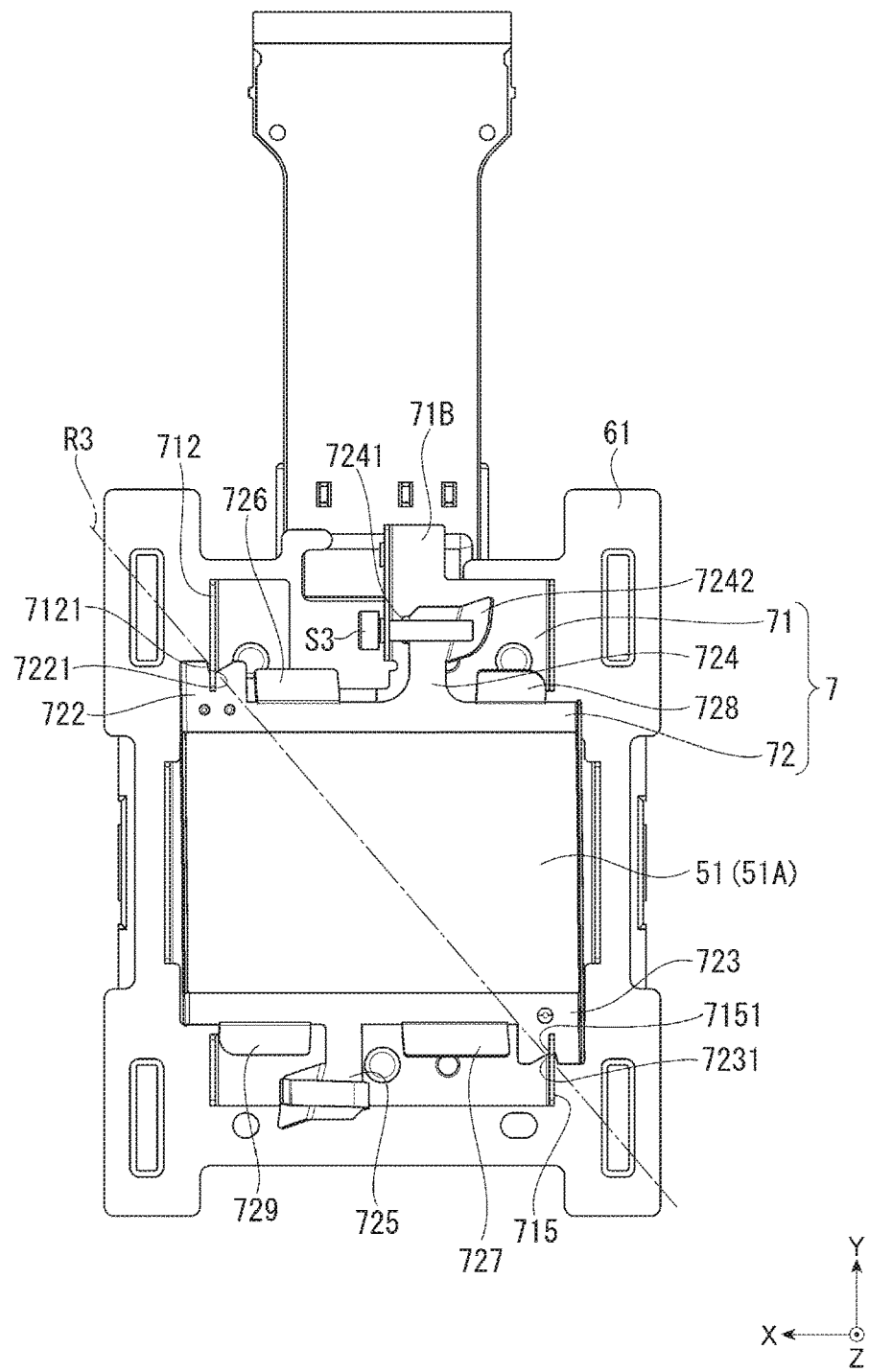
FIG. 19 is a diagram illustrating a rotational axis when the adjusting frame according to the second embodiment is inclined.

FIG. 18 is a perspective view illustrating a state where the adjusting frame 72 and the screw S3 are attached to the attaching member 71 and FIG. 19 is a diagram illustrating a rotational axis R3 when the adjusting frame 72 is inclined. In FIG. 18 and FIG. 19, the adjusting frame 72 indicates an arrangement state of the adjusting frame 72 of the optical compensation device 7 corresponding to a liquid crystal panel 353R for red light and a liquid crystal panel 353B for blue light among the liquid crystal panel 353.

[Attachment of Adjusting Frame to Attaching Member]

The adjusting frame 72, as illustrated in FIG. 18, is fixed in a state where a surface 51A of the optical compensation element 51 is directed toward the Z direction side. Specifically, the notches 7221 and 7231 of the fixing portions 722 and 723 of the adjusting frame 72 are respectively engaged with the notches 7121 and 7151 of the protruding portions 712 and 715 of the attaching member 71. On the other hand, none of the notches 7221 and 7231 of the fixing portions 722 and 723 of the adjusting frame 72 are engaged with the notches 7131 and 7141 of the protruding portions 713 and 714 of the attaching member 71. With this, the adjusting frame 72, as illustrated in FIG. 19, is supported at two points of the notches 7121 and 7221 and the notches 7151 and 7231 and is fixed to the attaching member 71 to be rotatable around the rotational axis R3 which has the two points as fulcrums.

[Adjustment of Inclination of Optical Compensation Element]

Figure 20:
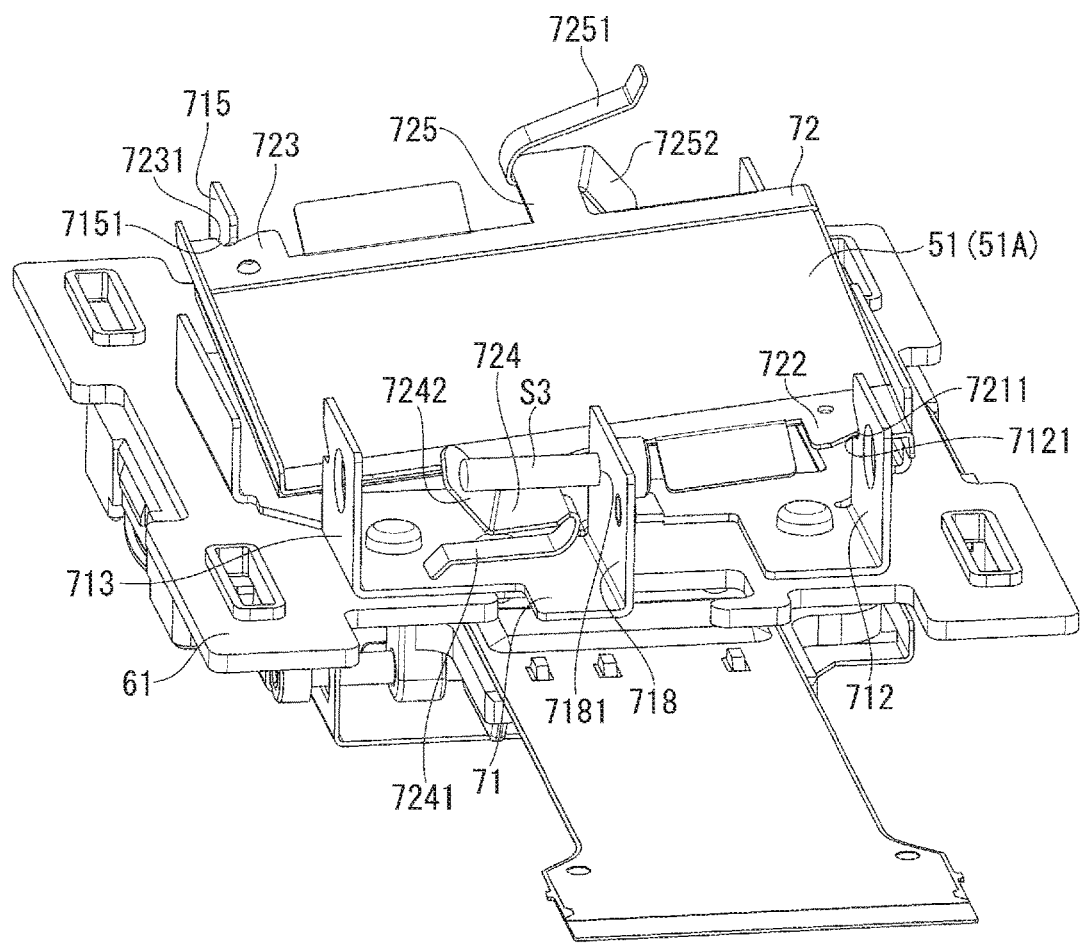
FIG. 20 is a perspective view of the optical compensation device in a state where the adjusting frame according to the second embodiment is inclined to the maximum.

FIG. 20 is a perspective view when the optical compensation device 7, which is in a state where the adjusting frame 72 is inclined to the maximum, is viewed from the Y direction side.

In the following, although a position adjustment (inclination adjustment) of the optical compensation element 51 to the liquid crystal panel 353R for red light will be described, the position adjustment of the optical compensation element 51 to the liquid crystal panel 353B for blue light is also similar.

In the protruding portion 718 of the attaching member 71, as illustrated in FIG. 20, the hole portion 7181 is formed and the screw S3 is screwed into the hole portion 7181. The screw S3 inserted into the hole portion 7181 from the X direction side is attached approximately parallel to a surface 71B of the attaching member 71, that is, to be movable in the direction along the X direction. For that reason, when the screw S3 is rotated and moved to a position indicated in FIG. 18 and FIG. 20, a second abutting portion 7242 of the adjusting portion 724 is moved to a direction opposite to the X direction. The second abutting portion 7242 is moved to the direction opposite to the X direction such that the first abutting portion 7241 is flexed to the direction opposite to the Z direction and the Y direction side of the adjusting frame 72 and the end portion of the side in the direction opposite to the X direction are inclined in the Z direction. With this, the adjusting frame 72 is inclined in the direction opposite to the Z direction by using the rotational axis R3 as a center.

That is, a moving amount (flexion amount of first abutting portion 7241) of the adjusting portion 724 is adjusted according to the insertion amount of the screw S3 in a direction of approaching or moving away from the surface 71B of the attaching member 71 such that the inclination amount of the optical compensation element 51 is adjusted. The screw S3 corresponds to a moving member of the invention.

Figure 21:
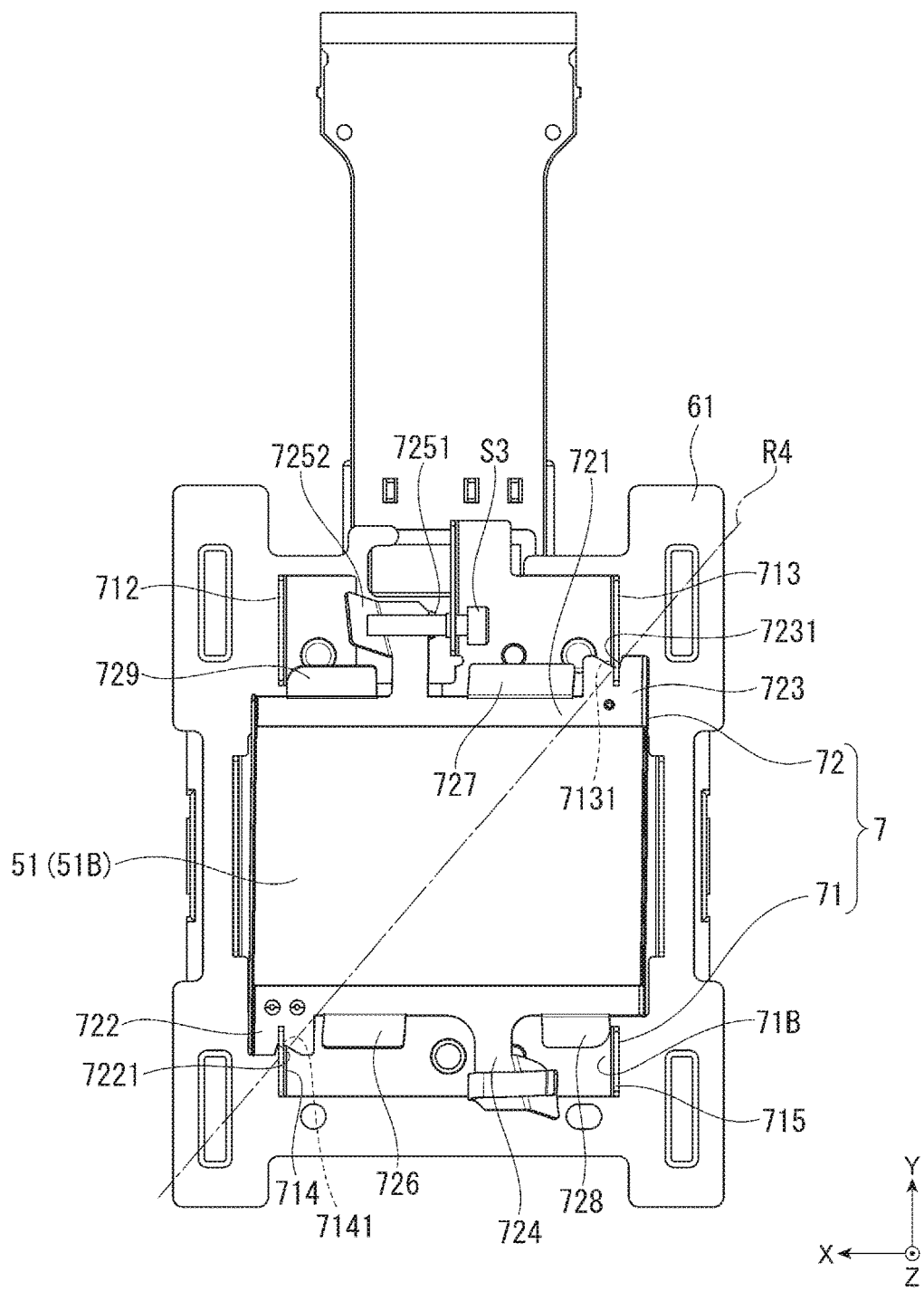
FIG. 21 is another diagram illustrating the rotational axis when the adjusting frame according to the second embodiment is inclined.

FIG. 21 is a diagram illustrating a rotational axis R4 when the adjusting frame 72 is inclined. In FIG. 21, the adjusting frame 72 indicates an arrangement state of the adjusting frame 72 of the optical compensation device 7 corresponding to a liquid crystal panel 353G for green light among the liquid crystal panels 353.

Next, a position adjustment of the optical compensation element 51 for the liquid crystal panel 353G for green light will be described.

The adjusting frame 72 of the optical compensation device 7 corresponding to the liquid crystal panel 353G for green light, as illustrated in FIG. 21, is attached to the attaching member 71 in a state where a rear surface 51B of the optical compensation element 51 is directed toward the Z direction. That is, the fixing portion 722 is attached in a state of being rotated at 180 degrees so as to be positioned at a side in the direction opposite to the Y direction in the adjusting frame 72 corresponding to the liquid crystal panel 353R for red light and the liquid crystal panel 353B for blue light.

Specifically, the notches 7221 and 7231 of the fixing portions 722 and 723 of the adjusting frame 72 are respectively engaged with the notches 7131 and 7141 of the protruding portions 713 and 714 of the adjusting member 71. On the other hand, none of the notches 7221 and 7231 of the fixing portions 722 and 723 of the adjusting frame 72 are engaged with the notches 7121 and 7151 of the protruding portions 712 and 715 of the attaching member 71. With this, the adjusting frame 72, as illustrated in FIG. 21, is supported at two points of the notches 7141 and 7231 and the notches 7131 and 7221 and is fixed to the attaching member 71 to be rotatable around the rotational axis R4 which has the two points as fulcrums.

In the protruding portion 718 of the attaching member 71, as illustrated in FIG. 21, the hole portion 7181 is formed and the screw S3 is screwed into the hole portion 7181. The screw S3 inserted into the hole portion 7181 from a side of a direction opposite to the X direction is attached approximately parallel to a surface 71B of the attaching member 71, that is, to be movable in the direction along the X direction.

For that reason, when the screw S3 is rotated, a second abutting portion 7252 of the adjusting portion 725 is moved to the X direction side. The second abutting portion 7252 is moved to the X direction side such that the first abutting portion 7251 is flexed to the side in the direction opposite to the Z direction and the Y direction side of the adjusting frame 72 and the end portion of the X direction side are inclined in the Z direction. With this, the adjusting frame 72 is inclined in the direction opposite to the Z direction by using the rotational axis R4 as a center.

That is, a moving amount (flexion amount of first abutting portion 7241) of the adjusting portion 724 is adjusted according to the insertion amount of the screw S3 in a direction of approaching or moving away from the surface 71B of the attaching member 71 such that the inclination amount of the optical compensation element 51 is adjusted.

[Rectifying of Cooling Air by Rectifying Portion]

Figure 22:
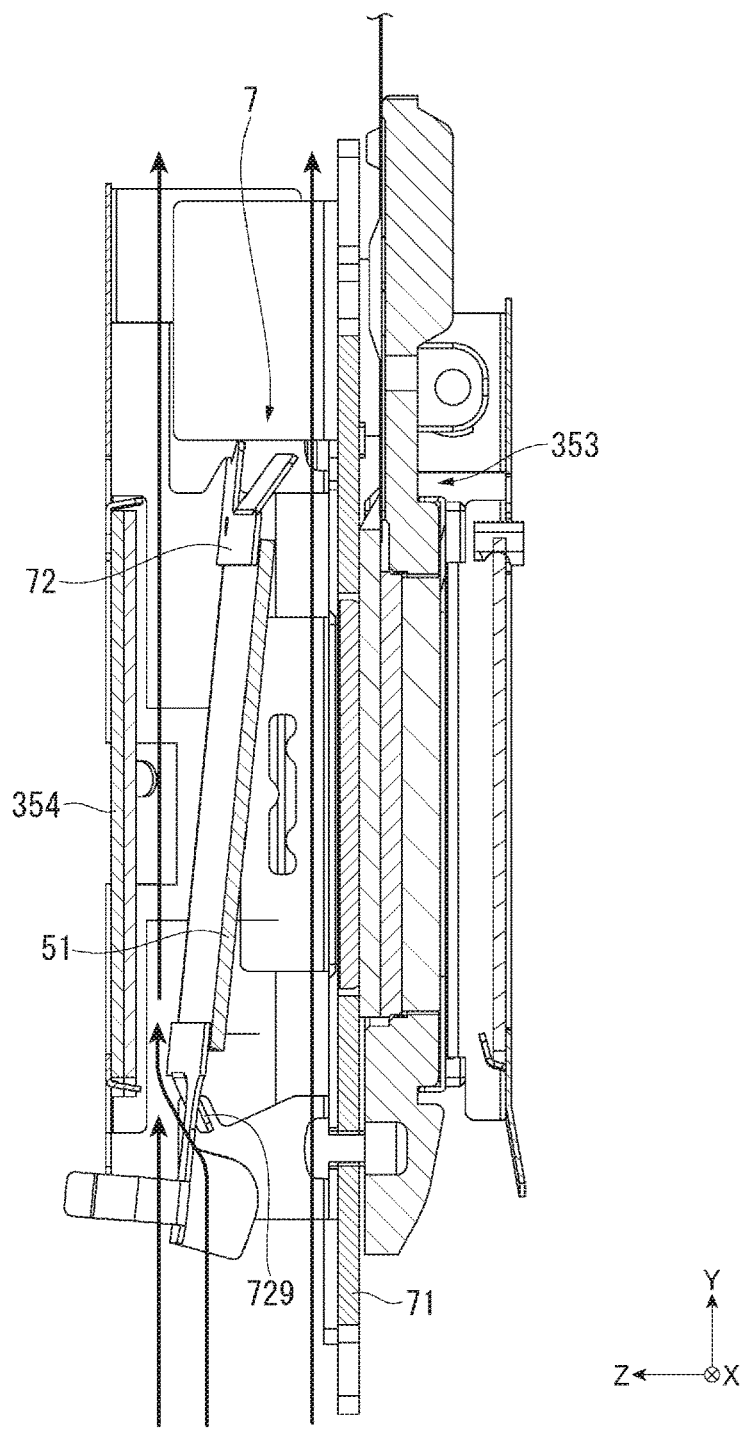
FIG. 22 is a sectional view illustrating a flow of cooling air of the optical compensation device according to the second embodiment.

FIG. 22 is a diagram illustrating a flow of cooling air rectified by the rectifying portion 729. In FIG. 22, the adjusting frame 72 indicates an arrangement state of the adjusting frame 72 of the optical compensation devices 7 of the liquid crystal panel 353R for red light and of the liquid crystal panel 353B for blue light among the liquid crystal panels 353.

The cooling air delivered from the cooling device CU flows along the Y direction with respect to respective liquid crystal panels 353, optical compensation devices 7, and emission side polarizing plates 354. In this case, the rectifying portion 729, as illustrated in FIG. 22, allows the cooling air to flow toward the emission side polarizing plate 354.

Specifically, a portion of the cooling air flows along the end surface of the light emission side in the tip portion of the rectifying portion 729 and flows in a direction directed toward the emission side polarizing plate 354. The cooling air flows in the Y direction along the emission side polarizing plate 354 and with this, the emission side polarizing plate 354 is cooled down.

On the other hand, although illustration is omitted, the cooling air flown toward the rectifying portion 727 flows along the end surface the light incident side in the tip portion of the rectifying portion 727 and flows toward the liquid crystal panel 353. The cooling air flows in the Y direction along the liquid crystal panel 353 and with this, the liquid crystal panel 353 is cooled down.

Although illustration is omitted, the rectifying portion 726 functions similarly to the rectifying portion 727 and the rectifying portion 728 functions similarly to the rectifying portion 729 in the optical compensation device 7 corresponding to the liquid crystal panel 353G for green light.

Effects of Second Embodiment

The projector of the present embodiment described above has the following effects, in addition to having effects similar to that of the projector 1.

The second abutting portions 7242 and 7252 are moved according to the movement of the screw S3 and the first abutting portions 7241 and 7251 are flexed according to the movement of the second abutting portions 7242 and 7252 and thus, when the second abutting portions 7242 and 7252 are moved to the maximum by the screw S3, the holding portion 721 is inclined to the maximum. According to this, it is possible to adjust the position of the optical compensation element 51 by the adjusting frame 72 with a simple configuration. The screw S3 is moved approximately parallel to the surface 71B opposing the optical compensation element 51 of the attaching member 71 and thus, it is possible to move the screw S3 even in a case where the screw S3 is covered by the emission side polarizing plate 354. Accordingly, even after the optical compensation device 7 is assembled, it is possible to adjust the position of the holding portion 721 and the optical compensation element 51 held in the holding portion 721.

The inclination amount of the holding portion 721 is adjusted according to the moving amount of the screw S3 with respect to the second abutting portions 7242 and 7252 and thus, the moving amount is adjusted to thereby make is possible to finely adjust the position of the optical compensation element 51, in addition to simply adjusting the inclination amount of the optical compensation element 51. Accordingly, in addition to making it possible to easily adjust the position of the optical compensation element 51 with a simple configuration, it is possible to finely adjust the position of the optical compensation element 51 even after the adjusting frame 72 is fixed to the attaching member 71.

Here, among the liquid crystal panel for red light, the liquid crystal panel for green light, and the liquid crystal panel for blue light, the liquid crystal panel 353G for green light differs from other liquid crystal panels 353R and 353B and needs to inverse light incident onto the liquid crystal panel 353G and thus, the rotational axis which inclines the optical compensation element 51 of the optical compensation device 7 corresponding to the liquid crystal panel 353G for green light needs to be differentiated. For that reason, in the optical compensation device of related art, the optical compensation devices corresponding to the liquid crystal panel 353R for red light and the liquid crystal panel 353B for blue light and the optical compensation device corresponding to the liquid crystal panel 353G for green light need to be respectively provided.

In contrast, according to the present embodiment, the pair of adjusting portions 724 and 725 is formed in approximately point symmetric with respect to the center of the optical compensation element 51 and thus, the adjusting frame 72 is rotated at 180° to thereby make it possible to differentiate the rotational axis of the optical compensation element 51. Accordingly, the same adjusting frame 72 is used in the optical compensation device corresponding to each of all liquid crystal panels 353 and thus, it is possible to reduce the manufacturing cost.

When the second abutting portions 7242 and 7252 are moved according to the movement of the screw S3, the first abutting portions 7241 and 7251 urge the second abutting portions 7242 and 7252 to a direction opposite to the moving direction by reaction force which is received from the attaching member 71. With this, it is possible to set the inclination amount of the holding portion 721 to a value according to the moving amount of the screw S3 and maintain the inclined state of the holding portion 721.

Any one of a plurality of notches 7121, 7131, 7141, and 7151 of the attaching member 71 is engaged with the notches 7221 and 7231 of the pair of fixing portions 722 and 723 such that the holding portion 721 is inclined by using the engaging point as fulcrums. With this, it is possible to rotate the optical compensation element 51 around the rotational axes R3 and R4 having at least two fulcrums as the center. Accordingly, it is possible to suitably and certainly adjust the position of the optical compensation element 51 with respect to the liquid crystal panel 353.

Modification of Embodiment

The invention is not limited to the respective embodiments described above and modifications and alterations within a range for achieving the object of the invention are included in the invention.

In the first embodiment, a screwing amount of the screw S2 as an insertion member is adjusted to thereby cause the adjusting portion 523 to approach the first holding member 41 as an attaching member and adjust an inclination amount of the holding portion 521 which holds the optical compensation element 51. The adjusting portion 523 is positioned at the corner portion CR1 different from the corner portions CR2 and CR3 at which the fixing portions 522 of the holding portion 521 are positioned. However, the invention is not limited thereto. That is, when the inclination amount of the optical compensation element 51 is adjusted to make it possible to adjust the position of the optical compensation element 51, it does not matter whatever the configuration and the position of the adjusting portion 523 are.

For example, a configuration in which the insertion member is inserted and removed to adjust the insertion amount to adjust the inclination amount and the insertion member is fixed by a fixing member (for example, adhesive) after the adjustment may be adopted.

For example, a configuration in which a lever, which protrudes to a direction away from the center CN1, as an adjusting portion is provided at the holding portion 521, the inclination amount is adjusted by operating the lever, and the holding portion 521 is fixed after the adjustment may be adopted.

Furthermore, the adjusting portion 523 moves to the direction of approaching the first holding member 41 according to the insertion amount of the screw S2 with respect to the first holding member 41 and inclines the holding portion 521 and the optical compensation element 51. However, the invention is not limited thereto. For example, a configuration in which the adjusting portion moves to a direction away from the first holding member 41 and inclines the holding portion 521 and the optical compensation element 51.

In the first embodiment, a configuration in which the bent portion 5221 and the fixing body portion 5222 are provided at each of two corner portions CR2 and CR3 which are in a diagonal relationship is exemplified. However, the invention is not limited thereto. For example, a configuration in which the bent portion 5221 and the fixing body portion 5222 are provided at only either any one of the pair of fixing portions 522 may be adopted. A configuration in which the fixing portion 522 is fixed to the first holding member 41 by inserting not the fixing body portion 5222 but the bent portion 5221 into the first holding member 41 as the attaching member may also be adopted.

The bent portion 5221 and the fixing body portion 5222 are provided to each of the pair of fixing portions 522 to thereby make it possible to more reliably prevent rotating of the virtual line R1 with respect to the Z axis and more suitably perform the position adjustment of the optical compensation element 51.

In the first embodiment, a configuration in which the fixing portion 522 is provided at two corner portions CR2 and CR3 which are in a diagonal relationship and the holding portion 521 is rotated around the virtual line R1 which intersects with respective sides of the optical compensation element 51 approximately at 45° to adjust the inclination amount of the optical compensation element 51 is exemplified. However, the invention is not limited thereto. That is, an angle of the virtual line R1 with respect to respective sides of the optical compensation element 51 may be greater than 45° or may be less than 45°.

The fixing portions 522 may be provided at, for example, the corner portions CR2 and CR4, along the virtual line orthogonal to the sides of the optical compensation element 51. In this case, for example, the adjusting portion 523 may be provided at the corner portion CR3 and between the corner portion CR1 and the corner portion CR3.

A configuration in which two fixing portions 522 are provided is exemplified. However, the invention is not limited thereto, and for example, a plurality of fixing portions 522 may be provided along one direction of the X direction and the Y direction. The holding portion 521 may be folded to provide a bent portion to thereby form a single fixing portion along one direction of the X direction and the Y direction. Even in the configuration, it is possible to incline the holding portion 521 along the virtual line passing through the arrangement position of the fixing portion. The holding portion 521 can be fixed by the fixing portion and a positional deviation can be prevented and thus, it is possible to adjust the inclination amount with higher accuracy.

In the respective embodiments described above, the optical compensation devices 5 and 7, as the optical compensation element adjusting mechanisms are fixed to the surfaces of the light emission side of the first holding members 41 and 61 which hold the liquid crystal panel 353 in the surfaces of the light incident side as the light modulation device. However, the invention is not limited thereto. That is, the optical compensation devices 5 and 7 may be attached to a member different from the first holding members 41 and 61 which hold the liquid crystal panel 353.

In the respective embodiments described above, a configuration in which the adjusting frames 52 and 72 include the rectifying portions 524 and 726 to 729 allowing air to flow toward the emission side polarizing plate 354 which is an optical component positioned at a post-stage of a light path of the optical compensation element 51 is adopted. However, the invention is not limited thereto. For example, the rectifying portions 524 and 726 to 729 may be provided not integrally with the holding portion 521 and provided separately. A cooling target to which air, of which the flow direction is changed by the rectifying portions 524 and 726 to 729, is blown is not limited to the emission side polarizing plate 354, but may be another component such as the liquid crystal panel 353. Furthermore, the rectifying portions 524 and 726 to 729 may be optional.

In the first embodiment, the center CN1 of the optical compensation element 51 before the position of the optical compensation element 51 is adjusted is not coincident with the center axis CN2 of light emitted from the liquid crystal panel 353. However, the invention is not limited thereto. That is, the center CN1 and the center axis CN2 may coincide with each other.

In the first embodiment, the holding portion 521 includes the pair of fixing portions 522. However, the invention is not limited thereto. For example, the holding portion 521 may include the pair of fixing portions 722 and 723 according to the second embodiment instead of the pair of fixing portions 522. Also, in this case, it is possible to achieve the same effect as that of the first embodiment.

In the second embodiment, the adjusting frame 72 includes the pair of fixing portions 722 and 723. However, the invention is not limited thereto. For example, the adjusting frame 72 may include the pair of fixing portions 522 according to the first embodiment instead of the pair of fixing portions 722 and 723. Also, in this case, it is possible to achieve the same effect as that of the second embodiment.

In the second embodiment, the screw S3 is moved parallel to (direction along the X direction) the surface 71B of the attaching member 71. However, the invention is not limited thereto. For example, the screw S3 may be moved in a direction (direction along the Z direction) opposing the surface 71B of the attaching member 71. In this case, the attaching member 71 may be provided with protruding portions which protrude to the position opposing the second abutting portions 7242 and 7252 of the adjusting portions 724 and 725 and the hole portions in which the screw S3 is screwed with the protruding portions.

In the second embodiment, the adjusting frame 72 is provided with the pair of adjusting portions 724 and 725 at the edge portion of the Y direction side of the holding portion 721 and at the edge portion of a side of a direction opposite to the Y direction. However, the invention is not limited thereto. For example, only either any one of the adjusting portions 724 and 725 may be provided. That is, the adjusting frames 72 of the optical compensation devices 7 corresponding to the liquid crystal panel 353R for red light and the liquid crystal panel 353B for blue light and the adjusting frame 72 of the optical compensation device 7 corresponding to the liquid crystal panel 353G for green light may be respectively provided.

In the second embodiment, the attaching member 71 includes the protruding portions 712 to 715 and the notches 7121, 7131, 7141, and 7151 are respectively formed at the protruding portions 712 to 715. However, the invention is not limited thereto. For example, only the protruding portions 712 and 715 may be included and only the protruding portions 713 and 714 may be included. That is, the attaching members 71 of the optical compensation devices 7 corresponding to the liquid crystal panel 353R for red light and the liquid crystal panel 353B for blue light and the attaching member 71 of the optical compensation device 7 corresponding to the liquid crystal panel 353G for green light may be respectively provided.

In the respective embodiments described above, a configuration in which the light source device 31 has the light source lamp 311 is adopted. However, the invention is not limited thereto. That is, as described above, a configuration having solid-state light source such as the LED or the LD may be adopted and a configuration in which light emitted from the LD is made incident onto a fluorescent substance and light emitted from the fluorescent substance is used may be adopted.

Furthermore, the light source device is not limited to a single light source device and a plurality of light source devices may be provided.

In the respective embodiments described above, the projector 1 includes three liquid crystal panels 353 as the light modulation device, but the invention is not limited thereto. That is, the invention can be applied to a projector using liquid crystal panels of which number is less than or equal to two or greater than or equal to four. In the respective embodiments described above, the arrangement position of each optical component can be suitably change in the optical unit 3, for example, a configuration having approximately L shape in plan view or a configuration having approximately U shape in plan view may be adopted.

In the respective embodiments described above, although the transmission-type liquid crystal panel 353 of which a light flux incident surface and a light flux emission surface differ is adopted, a reflection type liquid crystal panel of which a light incident surface and a light emission surface are the same may be used.

In the respective embodiments described above, although the projector 1 including the liquid crystal panel 353 as a light modulation device is exemplified, if it is a light modulation device capable of modulating the incident light flux according to image information, a light modulation device using the light modulation device other than a liquid crystal panel such as a device using a micro-mirror, for example, a digital micro-mirror device (DMD) may be used. In a case where the light modulation device is used, an optical element having a function other than a viewing angle compensation function may be used as an optical compensation element. In a case where the light modulation device is used, it is possible to omit respective polarizing plates 352 and 354.

REFERENCE SIGNS LIST

1: projector
5, 7: optical compensation device (optical compensation element adjusting mechanism)
41: first holding member (attaching member)
51: optical compensation element
52, 72: adjusting frame
71: attaching member
353: liquid crystal panel (light modulation device)
354: emission side polarizing plate
521, 721: holding portion
522, 722, 723: fixing portion
523, 724, 725: adjusting portion
524, 726, 727, 728, 729: rectifying portion
712, 713, 714, 715: protruding portion (a plurality of engagement portions)
5211, 7211: opening portion
5221: bent portion
5222: fixing body portion
5231: hole portion
7121, 7131, 7141, 7151, 7221, 7231: notch
7241, 7251: first abutting portion
7242, 7252: second abutting portion
CN1: center
CN2: center axis
CR1, CR2, CR3: corner portion
CU: cooling device
R1: virtual line
S2: screw (insertion member)
S3: screw (moving member)

The invention claimed is:

1. An optical compensation element adjusting mechanism, comprising:
an optical compensation element which optically compensates a light modulation device; and
an adjusting frame which adjusts an angle of the optical compensation element to the light modulation device, wherein the adjusting frame includes
an approximately rectangular holding portion which holds the optical compensation element,
a pair of fixing portions which respectively extends from positions, which become an approximately diagonal, of the holding portion in a direction intersecting with the holding portion and which is respectively fixed to an attaching member to which the adjusting frame is attached, and
an adjusting portion which is disposed at a position away from the pair of fixing portions and which inclines the optical compensation element by inclining the holding portion around a virtual line connecting the pair of fixing portions.

2. The optical compensation element adjusting mechanism according to claim 1, wherein
the adjusting portion is moved in a direction of approaching the attaching member to thereby incline the holding portion.

3. The optical compensation element adjusting mechanism according to claim 2, wherein
the adjusting portion includes a hole portion into which an insertion member inserted into the attaching member is inserted, and
a moving amount to the attaching member is adjusted according to the insertion amount of the insertion member to the attaching member to thereby adjust the inclination amount of the holding portion.

4. The optical compensation element adjusting mechanism according to claim 3, wherein
the holding portion is inclined by the adjusting portion to thereby urge the insertion member to a direction opposite to an insertion direction.

5. The optical compensation element adjusting mechanism according to claim 1, wherein
the adjusting portion is provided in the vicinity of a corner portion different from arrangement positions of the pair of fixing portions in the holding portion.

6. An optical compensation element adjusting mechanism, comprising:
an optical compensation element which optically compensates a light modulation device; and
an adjusting frame which adjusts an angle of the optical compensation element to the light modulation device,
wherein the adjusting frame includes
an approximately rectangular holding portion which holds the optical compensation element,
a pair of fixing portions which respectively extends from positions, which become an approximately diagonal, of the holding portion in a direction intersecting with the holding portion and which is respectively fixed to an attaching member to which the adjusting frame is attached, and
an adjusting portion which is disposed at a position away from the pair of fixing portions and which inclines the optical compensation element by inclining the holding portion around a virtual line connecting the pair of fixing portions,
wherein the adjusting portion is formed so as to be extended outward from the adjusting frame,
the adjusting portion includes
a first abutting portion abutting onto the attaching member, and
a second abutting portion onto which a moving member moving approximately parallel to a surface opposing the optical compensation element in the attaching member is abutted, and
the first abutting portion has flexibility.

7. The optical compensation element adjusting mechanism according to claim 6, wherein
the inclination amount of the holding portion is adjusted according to a moving amount of the moving member in a state of being abutted onto the second abutting portion.

8. The optical compensation element adjusting mechanism according to claim 6, wherein
the adjusting frame has a pair of the adjusting portions, and
the pair of adjusting portions is formed at a position which becomes approximately point symmetric with respect to the center of the optical compensation element when viewed from the attaching member side.

9. The optical compensation element adjusting mechanism according to claim 6, wherein
the second abutting portion urges the moving member by reaction force which is received by the first abutting portion from the attaching member.

10. The optical compensation element adjusting mechanism according to claim 1, wherein
the virtual line is a straight line inclined approximately at 45° with respect to respective sides of the optical compensation element held in the holding portion.

11. The optical compensation element adjusting mechanism according to claim 6, wherein
the attaching member includes a plurality of engagement portions with which the pair of fixing portions is engaged, and
the pair of fixing portions and the plurality of engagement portions respectively have notches engaging with each other.

12. The optical compensation element adjusting mechanism according to claim 1, wherein
at least any one of the pair of fixing portions has
a bent portion bent from the holding portion, and
a fixing body portion extending from a tip of the bent portion approximately parallel to the holding portion, and fixed to the attaching member.

13. A projector, comprising:
a light source device;
a light modulation device which modulates light emitted from the light source device;
a projection optical device which projects light modulated by the light modulation device; and
the optical compensation element adjusting mechanism according to claim 1,
wherein the optical compensation element adjusting mechanism is disposed between the light modulation device and the projection optical device.

14. The projector according to claim 13, wherein
the light modulation device includes
a liquid crystal panel modulating light, which is made incident, and
a holding member held at a light incident side by the liquid crystal panel, the holding member is the attaching member, and
the pair of fixing portions is fixed to a surface of a light emission side of the holding member.

15. The projector according to claim 13, further comprising:
a polarizing plate disposed between the light modulation device and the projection optical device; and
a cooling device sending cooling air to a member which becomes a cooling target of the projector,
wherein the adjusting frame has a rectifying portion which allows the cooling air sent from the cooling device to flow toward the polarizing plate.

16. The projector according to claim 13, wherein
the center axis of light emitted from the light modulation device passes through a position away from the center of the optical compensation element before the optical compensation element is inclined by the adjusting portion.

* * * * *